(12) United States Patent
Krishnamurthy et al.

(10) Patent No.: US 11,017,288 B2
(45) Date of Patent: May 25, 2021

(54) SPIKE TIMING DEPENDENT PLASTICITY IN NEUROMORPHIC HARDWARE

(71) Applicant: Intel Corporation, Santa Clara, CA (US)

(72) Inventors: Ram Kumar Krishnamurthy, Portland, OR (US); Gregory Kengho Chen, Portland, OR (US); Raghavan Kumar, Hillsboro, OR (US); Phil Christopher Knag, Portland, OR (US); Huseyin Ekin Sumbul, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 828 days.

(21) Appl. No.: 15/845,245

(22) Filed: Dec. 18, 2017

(65) Prior Publication Data

US 2019/0042910 A1    Feb. 7, 2019

(51) Int. Cl.
*G06N 3/04* (2006.01)
*G06N 3/08* (2006.01)
*G06N 3/063* (2006.01)

(52) U.S. Cl.
CPC .............. *G06N 3/04* (2013.01); *G06N 3/049* (2013.01); *G06N 3/063* (2013.01); *G06N 3/088* (2013.01)

(58) Field of Classification Search
CPC .......... G06N 3/04; G06N 3/088; G06N 3/063; G06N 3/049
See application file for complete search history.

(56) References Cited

U.S. PATENT DOCUMENTS

| | | | |
|---|---|---|---|
| 10,026,395 B1* | 7/2018 | Bekolay | G10L 15/02 |
| 10,129,456 B1* | 11/2018 | Kim | H04N 5/23212 |
| 2019/0042942 A1* | 2/2019 | Natroshvili | G06N 3/088 |

* cited by examiner

*Primary Examiner* — Kyoung Lee
(74) *Attorney, Agent, or Firm* — Schwegman Lundberg & Woessner, P.A.

(57) ABSTRACT

System and techniques for spike timing dependent plasticity (STDP) in neuromorphic hardware are described herein. A first spike may be received, at a first neuron at a first time, from a second neuron. The first neuron may produce a second spike at a second time after the first time. At a third time after the second time, the first neuron may receive a third spike from the second neuron. Here, the third spike is a replay of the first spike with a defined time offset. The first neuron may then perform long term potentiation (LTP) for the first spike using the third spike.

25 Claims, 23 Drawing Sheets

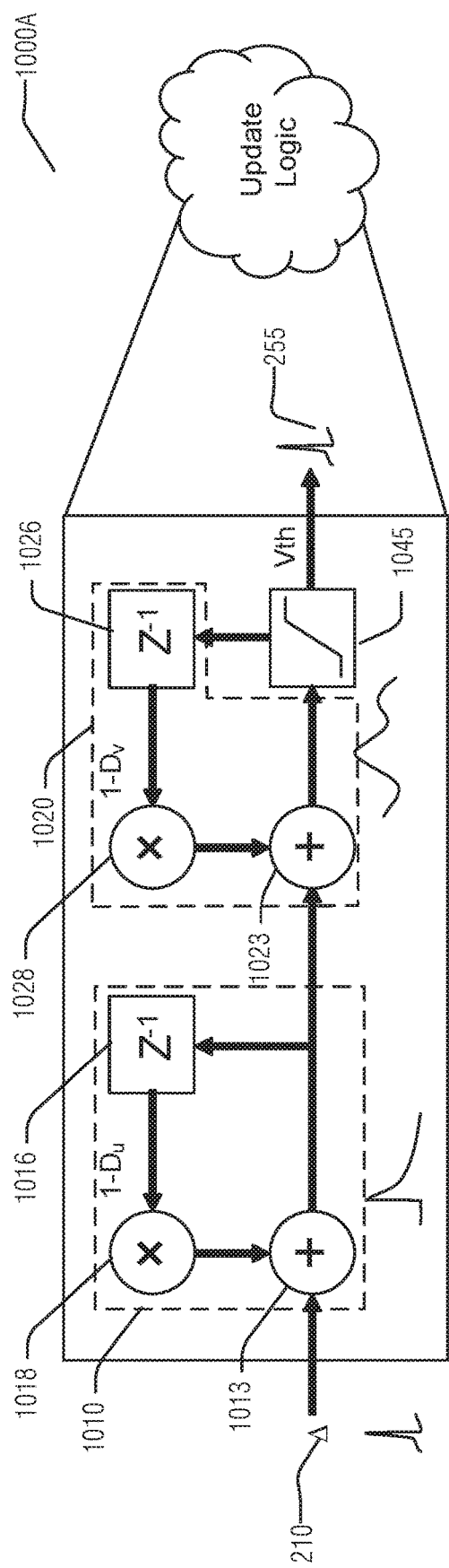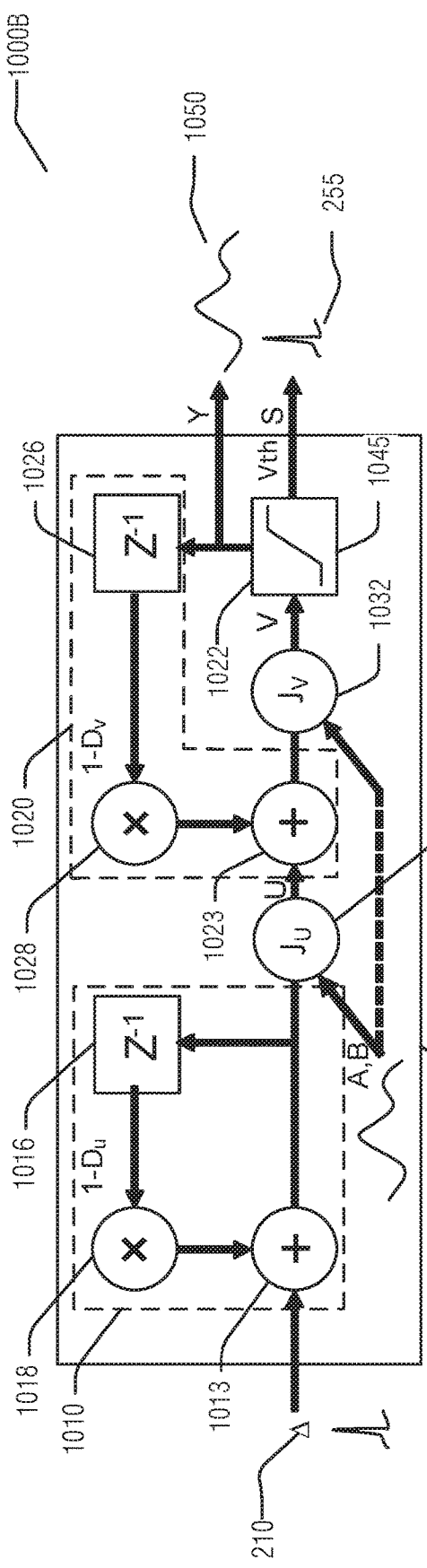
FIG. 10A
FIG. 10B

SPIKE TIMING DEPENDENT PLASTICITY IN NEUROMORPHIC HARDWARE

TECHNICAL FIELD

The present disclosure relates generally to digital signal processing and, more particularly, to spike timing dependent plasticity (STDP) in neuromorphic hardware. Some examples are applicable to neuromorphic computing using digital neuromorphic cores (e.g., neural-cores or neural-core structures).

BACKGROUND

A neuromorphic processor is a processor that is structured to mimic certain aspects of the brain and its underlying architecture, particularly its neurons and the interconnections between the neurons, although such a processor may deviate from its biological counterpart. A neuromorphic processor may be composed of many neuromorphic processor cores that are interconnected via a network architecture, such as a bus or routing devices, to direct communications between the cores. The network of cores may communicate via short packetized spike messages sent from core to core. Each core may implement some number of primitive nonlinear temporal computing elements (e.g., neurons). When a neuron's activation exceeds some threshold level, it may generate a spike message that is propagated to a set of fan-out neurons contained in destination cores. The network then may distribute the spike messages to destination neurons and, in turn, those neurons update their activations in a transient, time-dependent manner.

Spike timing dependent plasticity (STDP) updates synaptic weights—a value that modifies spikes received at the synapse to have more or less impact on neuron activation than the spike alone—based on when, in relation to neuron activation (e.g., an outbound spike) an incoming spike is received. Generally, the closer to the outbound spike that the inbound spike is received, the greater the corresponding synapse weight is modified. If the inbound spike precedes the outbound spike, the weight is modified to cause a future spike at that synapse to be more likely to cause a subsequent outbound spike. If the inbound spike follows the outbound spike, the corresponding synapse weight is modified to cause a future spike at the synapse to be less likely to cause a subsequent outbound spike. These relationships dampen noise (e.g., incoming spikes that follow the outbound spike had no part in creating the outbound spike and may be considered noise) while reinforcing pattern participants.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 10A is a block diagram illustrating state dynamics for a dendritic compartment according to a simple neuron model, according to an embodiment.

FIG. 10B is a block diagram illustrating state dynamics and the dendritic accumulation process for a dendritic compartment according to a multi-compartment neuron model, according to an embodiment.

DETAILED DESCRIPTION

Spiking Neural Networks (SNNs) are demonstrated to perform cognitive tasks—such as computer vision and speech recognition—with high energy efficiency. Generally, SNNs include large numbers of neuron processing elements that communicate through weighted synapse connections.

Neurons integrate their inputs (received via a neuron's synapses) onto a membrane potential and generate an output when the integrated input surpasses a threshold (e.g., within a defined time period). SNNs synapse weights modify the effect of stimuli (e.g., a spike) received at the synapse on the membrane potential. Once trained, a SNN has synapses weights that modify the SNN behavior to accomplish a task. Due to the large number of synapses in an SNN (e.g., across all neurons), hand weighting synapses is not practical. Learning rules, such as STDP, are thus used to create SNNs that are useful for a variety of tasks.

Figure 1:
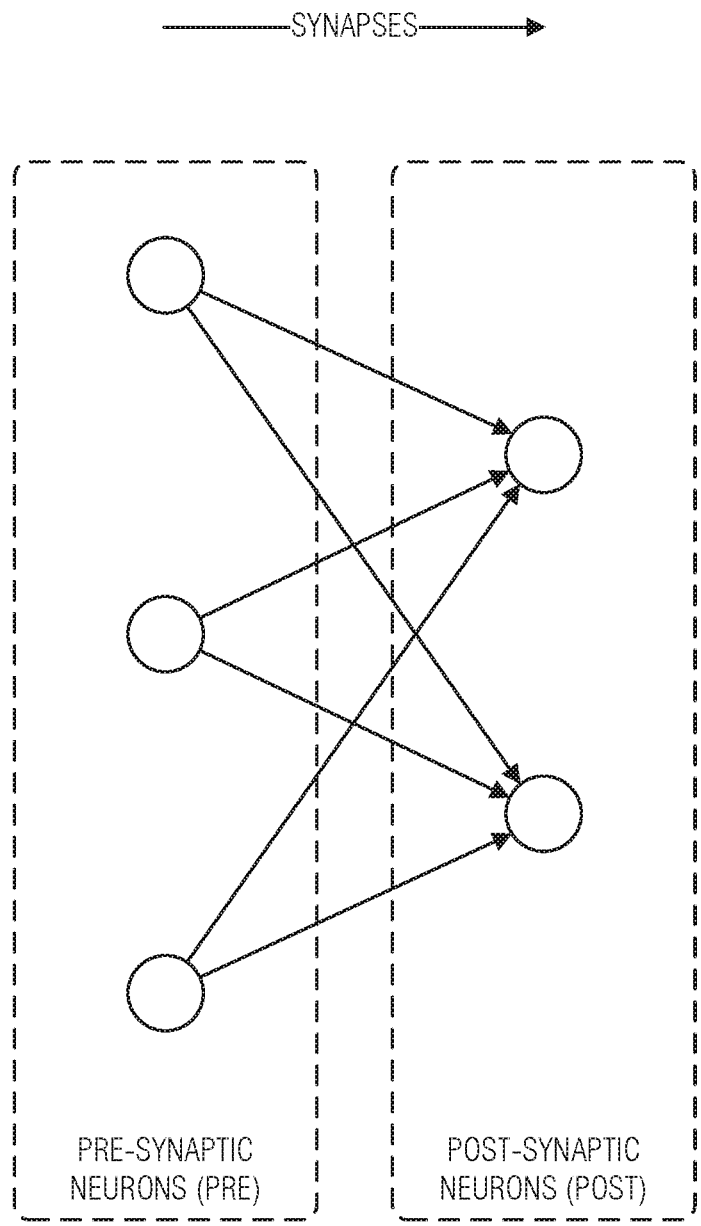
FIG. 1 illustrates a directed neuron model, according to an embodiment.

FIG. 1 illustrates a directed neuron model, according to an embodiment. STDP trains synapse weights based on relative spike timing between an incoming (e.g., pre-synaptic or PRE) spike and an outgoing (e.g., post-synaptic or POST) spike. If one neuron (PRE) causes another neuron to spike (POST), the synaptic connection that received the PRE spike is strengthened. Otherwise, if the PRE spike follows the POST spike, the PRE spike is uncorrelated to the POST spike and the synaptic connection that received the PRE spike is weakened (e.g., by modifying the synaptic weight for the synapse).

Generally, in neuromorphic implementations, time is discretized into time steps that represent a fixed duration of biological time (such as one millisecond). However, time may not be based on an external clock. Thus, two time steps may represent, to the neuromorphic hardware, two equal increments of time even if the time measured by an external clock varies between the two time steps. As used herein, concepts of "first," "later," "before," etc. are based on the time steps of the neuromorphic hardware and not time as otherwise measured.

Figure 2:
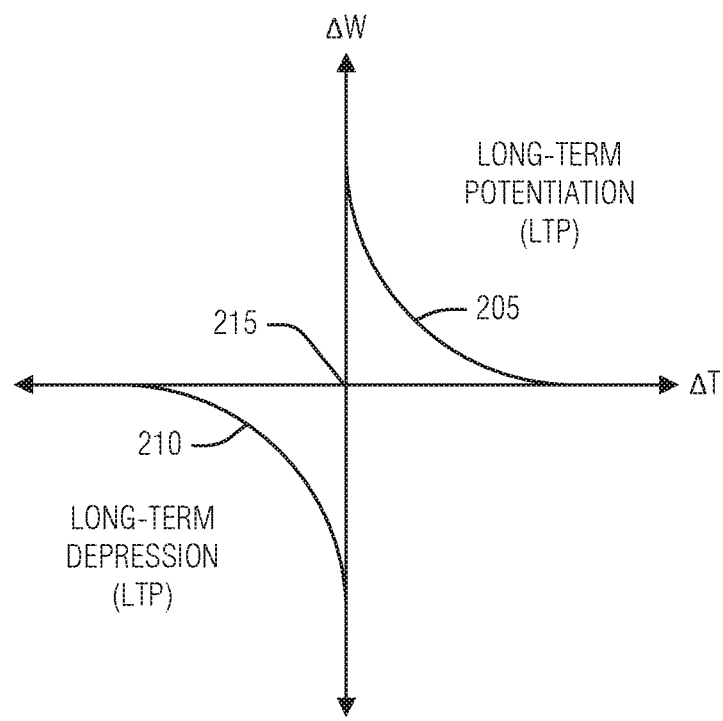
FIG. 2 illustrates a relationship between a relative incoming spike arrival and corresponding synaptic weight change, according to an embodiment.

FIG. 2 illustrates a relationship between a relative incoming spike arrival and corresponding synaptic weight change, according to an embodiment. As illustrated the vertical, $\Delta w$-axis represents a weight by which a synapse is modified and the horizontal $\Delta t$-axis represents a time from a POST spike, a positive $\Delta t$ representing a PRE spike preceding the POST spike. Thus, the origin 215 on the $\Delta t$-axis represents the moment in time of the POST spike. If a PRE spike precedes a POST spike, there is a higher probability of a causal relationship between the PRE spike and the POST spike. Thus, the synaptic weight is increased through Long-term Potentiation (LTP) according to the function 205. Note, the closer in time that the PRE spike precedes the POST spike, the greater the weight given to the corresponding synapse. Conversely if the POST spike precedes and the PRE spike, it is less likely that the spikes are causal. Therefore the synapse weight is decremented with Long-term Depression (LTD) according to function 210. The amount by which the synapse is potentiated or depressed is dependent on the difference in spike times between the PRE spike and the POST spike. If the PRE spike and the POST spike times are separated by more than a defined value, such as the maximum STDP time interval, then no synapse update is performed. This is illustrated by the convergence of the functions 205 and 210 on $\Delta w=0$ as they move away from the origin 215.

Figure 3:
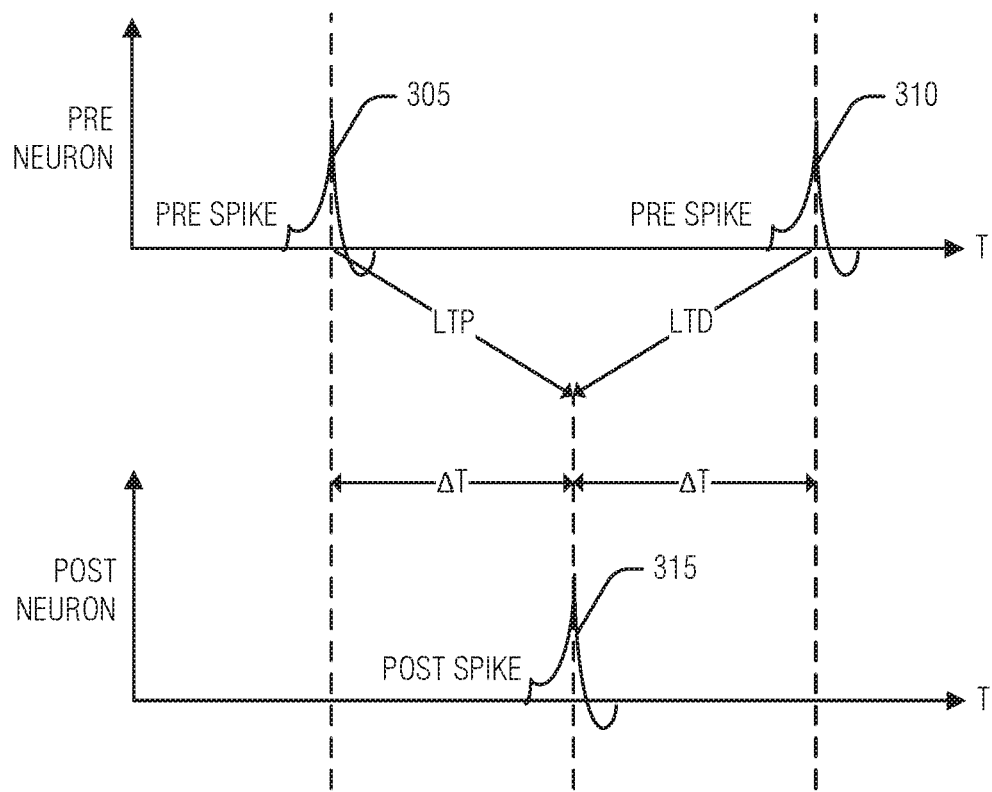
FIG. 3 illustrates spike timing for LTP and LTD between two neurons, according to an embodiment.

FIG. 3 illustrates spike timing for LTP and LTD between two neurons, according to an embodiment. Here, t is synchronized between the PRE-neuron spiking on top and the POST neuron spiking on bottom. The PRE spike 305 precedes the POST spike 315 in time and this will contribute to LTP. Conversely, the PRE spike 310 follows the POST spike 315 in time, and thus contributes to LTD on a synapse connecting the PRE neuron to the POST neuron.

Neuromorphic hardware implements SNNs as multi-core neuro-processors (e.g., neuro-synaptic cores, neural-cores, neural-core structures, etc.). Neuro-cores often implement several neurons that are colocated with synapse memory blocks to hold synapse weights. The colocation of the synapse memory on the core is used to overcome data-memory bandwidth bottlenecks. Generally, neural-cores are tiled and connected with a Network on Chip (NoC) or other interconnect fabric. Performing STDP on-chip generally involves collecting information from the PRE neuron (the neuron that generated a PRE spike), the synapse memory location, and POST spike. These pieces of information may be spatially distributed across the neural-cores, the tiles, or the neuromorphic chips.

Figure 4:
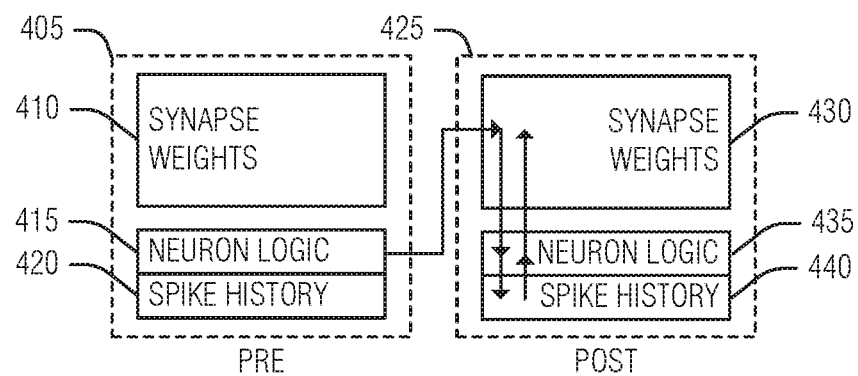
FIG. 4 illustrates long-term depression on a synapse for a spike from a pre-neuron to a post-neuron, according to an embodiment.
Figure 4:
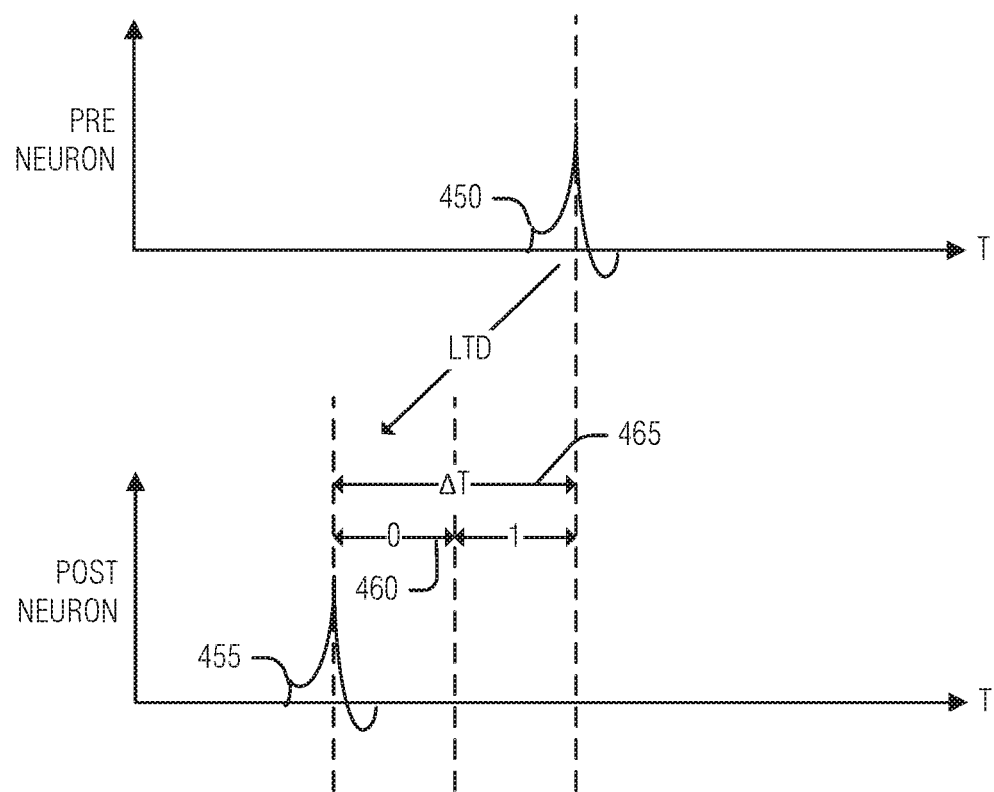

FIG. 4 illustrates long-term depression on a synapse for a spike from a pre-neuron to a post-neuron, according to an embodiment. Generally, when an input spike (e.g., generated by the PRE neuron 405 using its synapse weights 410 and neuron logic 415) is received at the current timestep, the POST neuron 425 checks its spike history counter 440, calculates the change in synaptic weight (e.g., at the neuron logic 435), and updates the synapse memory 430. For LTD, the data gathering is straightforward. The POST neuron 425 registers the PRE spike from the PRE neuron 405 neuron logic 415 (e.g., the membrane potential thresholding) at the neuron logic 435, determines that the PRE spike follows a POST spike by consulting its spike history 440, performs LTD at the neuron logic 435, and updates its synapse weight 430. The spike timing diagram at the bottom of FIG. 4 illustrates the POST spike 455 preceding the PRE spike 450 by two time increments 460 that, added together, are the $\Delta t$ 465 used for LTD on the synapse.

LTP poses a challenge because the spike history information that is needed is the spike history 420 of the PRE neuron 405, and thus is not readily accessible. When POST spikes, any of its fan-in synapses may need to be updated based on the spiking activity of the fan-in PRE neurons. POST neurons may have 10,000 or more PRE neuron feeding into it, each with their own spike history located in disparate parts of the neuromorphic hardware. A technique to gather information to perform LTP uses back-propagation potential. Here, when the POST neuron spikes, in addition to sending its spike to its fan-out neurons, it sends a back-propagating action potential to all of the PRE neurons. The back-spike does not initiate any spike integration on the receiving PRE neurons. Rather, the back-spike merely allows LTP to be performed.

A problem with the back-propagation potential model lies in a requirement that backward connectivity must be available for all neurons. This requirement increases neuron mapping overhead, and also inter-neural-core network capacity. For many networks, including sparsely connected or recursive networks, these additional burdens may be insurmountable, greatly reduce the SNN capacity, or increased power consumption. Further, back-propagation potential may affect memory access patterns. Each synaptic memory must be capable of accessing weights in either a forward or backward access pattern, e.g., row-wise or column-wise. This makes it more difficult to access multiple synapses simultaneously from the same memory bank. This simultaneous access of synapse memory is more energy efficient than accessing synapses one-by-one.

Another technique that has been tried to address the LTP issues noted above is LTP with polling duplicated PRE spike history. Here, the PRE spike history is duplicated at the input of each neural-core that receives a PRE spike. Whenever a POST neuron spikes, the duplicated PRE spike histories are checked and LTP is performed if the PRE spike history is within a specified range. This technique increases the amount of memory (e.g., buffer) storage required on the chip because the spike history is tracked at both the sender (e.g., PRE neuron) and receivers (e.g., POST neurons), which may be numerous. This arrangement increases energy overhead and manufacturing costs. Moreover, this technique may increase latency by introducing many unnecessary LTP checks. For example, if LTP is performed whenever POST spikes and the PRE spike history counter is within the maximum STDP time interval denoted by T below (e.g., sixteen time-steps or cycles), on each of the T time-steps after the PRE neuron spikes, the POST spike histories need to be checked. This increases the latency and energy overhead of performing LTP by T times compared to a purely event based system.

To address the LTP issues noted above, LTP may be performed by replaying each neuron spike after the maximum STDP time interval (T) has elapsed. This solves the LTP timing issues, which is, LTP is performed at a receiving neuron on spikes that arrive prior to a POST spike. It is not possible to perform LTP when receiving a PRE spike because it is not possible to predict when a POST spike will occur in the future. However, by waiting T time-steps, the replay PRE spike will now follow the POST spike if it occurred, allowing the receiving neuron to subtract T from the replay spike arrival time to determine by how much the PRE spike preceded the POST spike, the information used to perform LTP.

The time difference between PRE-then-POST spike pairs (e.g., $\Delta t = t_{POST} - t_{PRE}$) is the difference between T and the time difference between the replay of PRE (e.g., the REPLAY spike) and the POST spike. This may be expressed as ($\Delta t = T - (t_{REPLAY} - t_{POST})$). In an example, to efficiently handle multiple PRE spikes from a single PRE neuron, PRE spikes that occur between the original PRE spike and the original scheduled REPLAY spike are replaced by a last PRE spike and corresponding REPLAY spike. Thus, the time interval between the two PRE spikes (T') replaces T in the formulation above.

Figure 5:
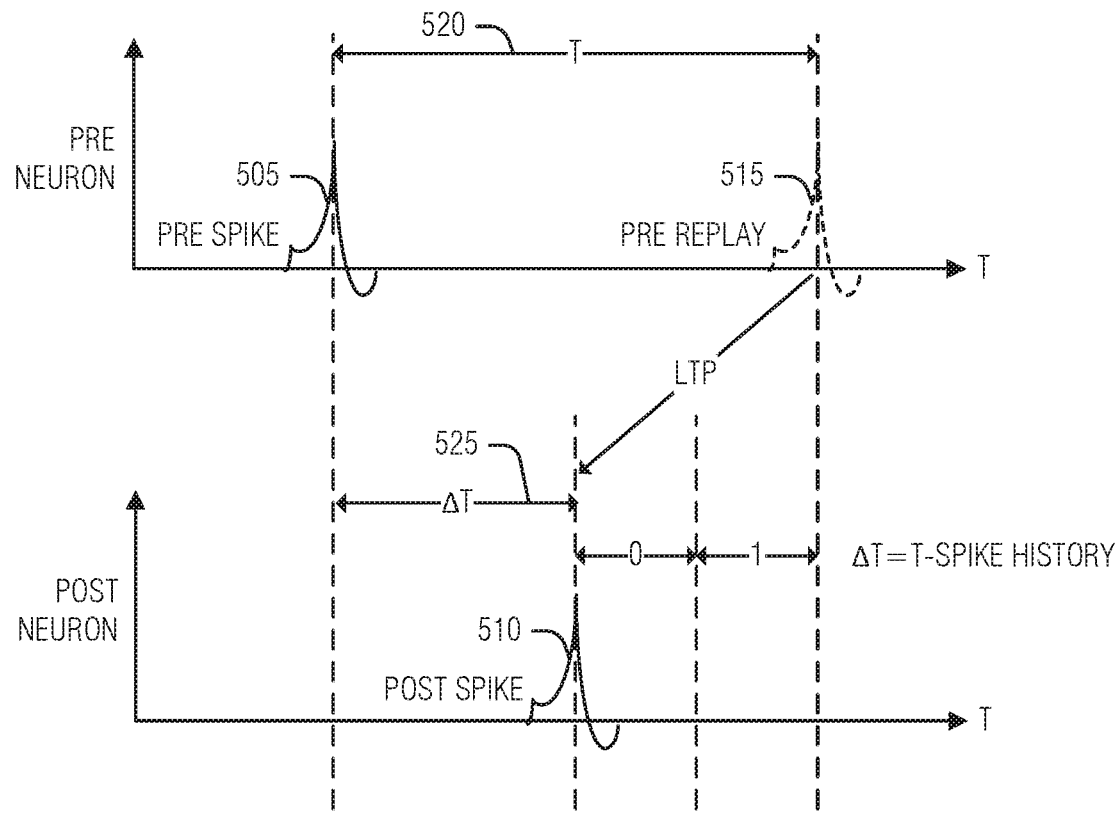
FIG. 5 illustrates long-term potentiation on a synapse for a spike using a replay spike, according to an embodiment.

FIG. 5 illustrates long-term potentiation on a synapse for a spike using a replay spike, according to an embodiment. As noted above, LTP is performed by replaying each neuron spike after the maximum STDP time interval (T) has elapsed. The relative spike timing used to compute the synaptic weight update using STDP is ($\Delta t = t_{POST} - t_{PRE}$). For LTD, this value is computed by checking the value of the POST neuron's spike history counter when the PRE spike arrives. However, this is not possible for LTP, because the PRE spike is received before the POST spike fires. However, as illustrated in FIG. 5, when the PRE spike 505 is replayed (e.g., REPLAY spike 515) after a fixed number of time-steps T 520—where T 520 is the maximum spike time difference for STDP calculations; the synaptic weight update being zero for spikes further apart in time than T 520—the relative spike timing between a POST spike 510 and a REPLAY spike 515, $\Delta t$ 525, is determined based solely on the POST spike history counter (e.g., number of time-steps since the POST spike 510 occurred) in a manner analogous to LTD. Thus, performing LTP varies from performing LTD in that $\Delta t$ 525 is the difference between T 520 and the POST spike history value, expressed as ($\Delta t = T - (t_{REPLAY} - t_{POST})$).

An advantage to this technique comes from the ability to rely on only forward propagating spikes to implement STDP. This eliminates backward connectivity mapping and its attendant disadvantages. Further, spike history for each neuron is stored only in the neuron itself (e.g., only POST or outbound spikes are stored in histories across the neural network). This eliminates the extra chip space and energy consumption of storing PRE spikes at neurons. The replay technique described herein is event-based—in that spike histories do not need to be continuously monitored over the STDP time interval—where LTP updates are performed only once, at the end of the STDP time interval, leading to improved latency, chip space efficiency, and power efficiency over existing techniques.

Figure 6:
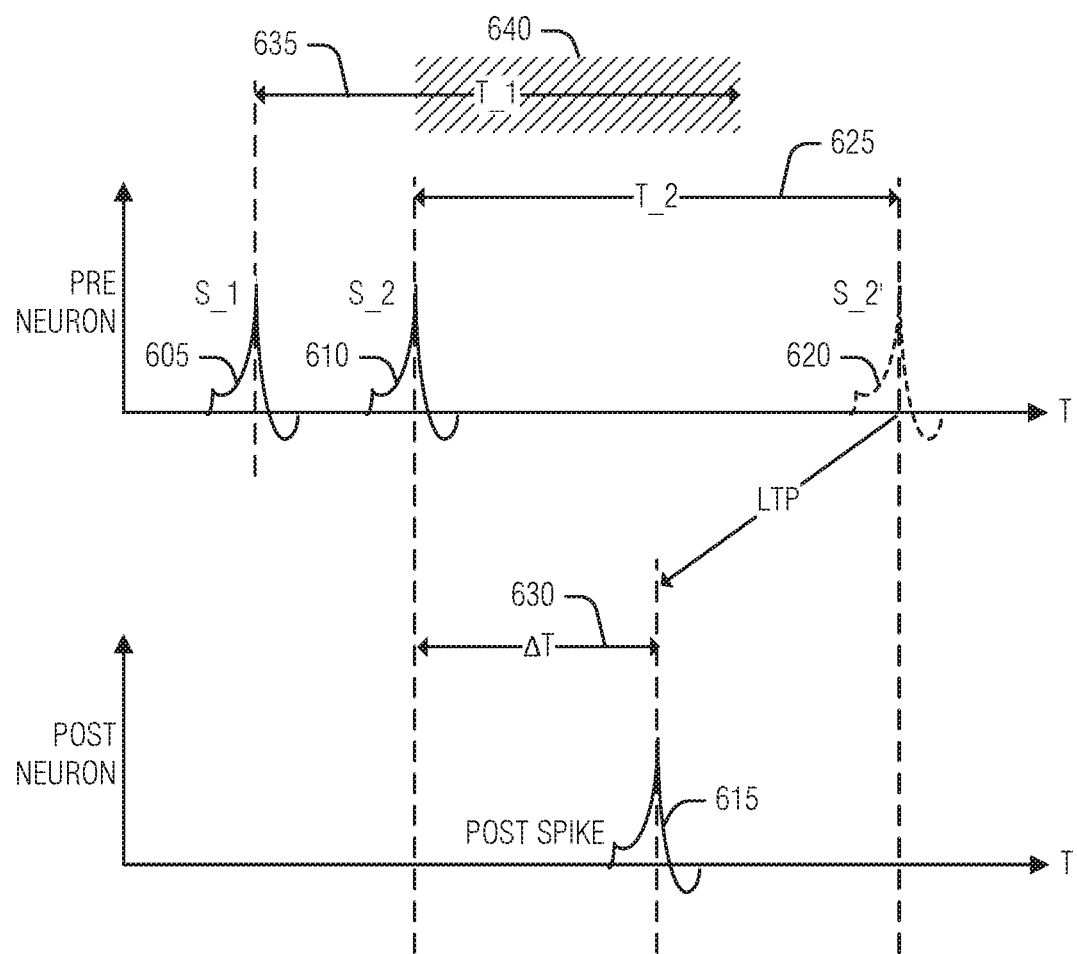
FIG. 6 illustrates long-term potentiation on a synapse for multiple spikes using a single replay spike, according to an embodiment.

FIG. 6 illustrates long-term potentiation on a synapse for multiple spikes using a single replay spike, according to an embodiment. This embodiment is a variation on a single PRE spike with corresponding REPLAY spike described above. Here, the same neuron (e.g., PRE neuron) fires twice within the maximum STDP time interval, PRE spike S_1 605 and PRE spike S_2 610. In this example, the second spike (PRE spike S_2 610) cancels the replay of the first spike (PRE spike S_1 605) and assumes its functionality. Thus, the only REPLAY spike 620 is a replay of PRE spike S_2 610, and is denoted S_2', canceling the replay of PRE spike S_1 605. This technique capitalizes on an STDP practice in which LTP is performed for a most recent PRE spike (PRE spike S_2 610) with respect to the POST spike 615. Thus, the REPLAY of PRE spike S_2 610, REPLAY spike S_2' 620, is processed as usual to perform LTP, where the arrival of REPLAY spike 620 is subtracted from T (T_2 625) to find $\Delta t$ 630. The T relationship with respect to PRE spike S_1 605 (e.g., T_1 635 and its overlap 640 with T_2 625) are shown to compare with the single PRE spike technique described above.

Figure 7:
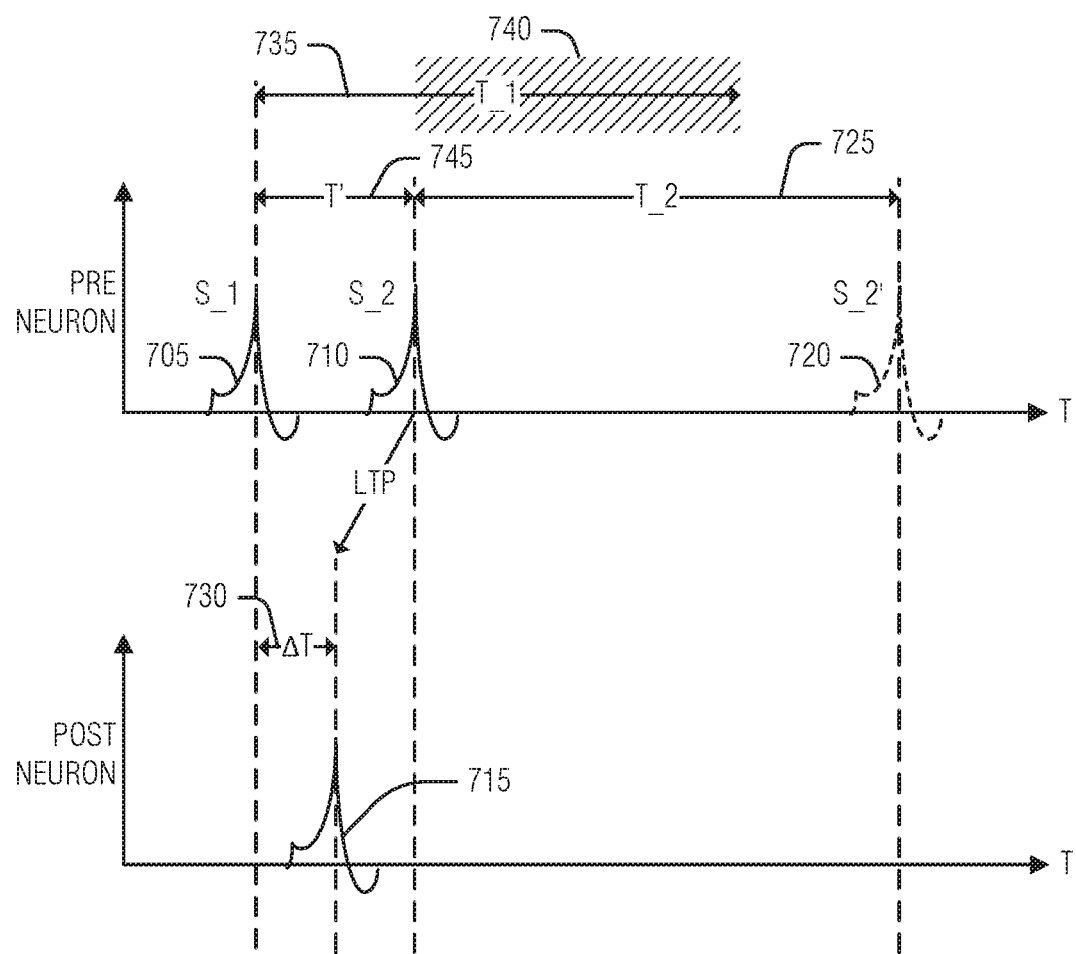
FIG. 7 illustrates long-term depression and long-term potentiation on a synapse for multiple spikes using a single replay spike, according to an embodiment

FIG. 7 illustrates long-term depression and long-term potentiation on a synapse for multiple spikes using a single replay spike, according to an embodiment. It is not always the case that a second PRE spike from a neuron will precede a POST spike. In this scenario, both LTP and LTD should be performed on the multiple PRE spikes. However, this entails the possibility that a REPLAY spike will replace an LTP PRE spike replay with an LTD spike replay. To address this issue, the REPLAY spike includes a timing offset for a spike that it replaced. This timing offset may then be used to determine whether a replaced REPLAY spike represented an LTP spike. Thus, PRE spike S_1 705 precedes POST spike 715 that also precedes PRE spike S_2 710. T time-steps after PRE spike S_2 710 (T_2 725), the REPLAY spike 720 is sent. The REPLAY spike 720 includes the value T' 745, representing the time between the PRE spike S_1 705 and PRE spike S_2 710. Thus, the PRE Spike S_2 710 cancels the replay of PRE spike S_1 705, and assumes it's functionality to perform LTP by including the value T' 745, which represents the time between the PRE spike S_1 705 and PRE spike S_2 710.

Because PRE spike S_2 arrived after POST spike 715, it will directly initiate LTD. To perform LTP on PRE spike S_1, $\Delta t$ is calculated as the difference of the PRE spike time interval T' 745 and the POST spike history value: $\Delta t = T' - (t_{PRE} - t_{POST})$. Again, The T relationship with respect to PRE spike S_1 705 (e.g., T_1 735 and its overlap 740 with T_2 725) are shown to compare with the single PRE spike technique described above.

The replay techniques described above compute LTP synaptic weight updates in an event-driven manner without reverse mapping required and fewer spike history checks. Further, the technique has low chip area overhead because spike history for every neuron is stored only within the neuron itself and not replicated in other areas of the chip. Thus, the techniques provide an energy-efficient solution to perform on-chip learning in neuromorphic computers.

Figure 8:
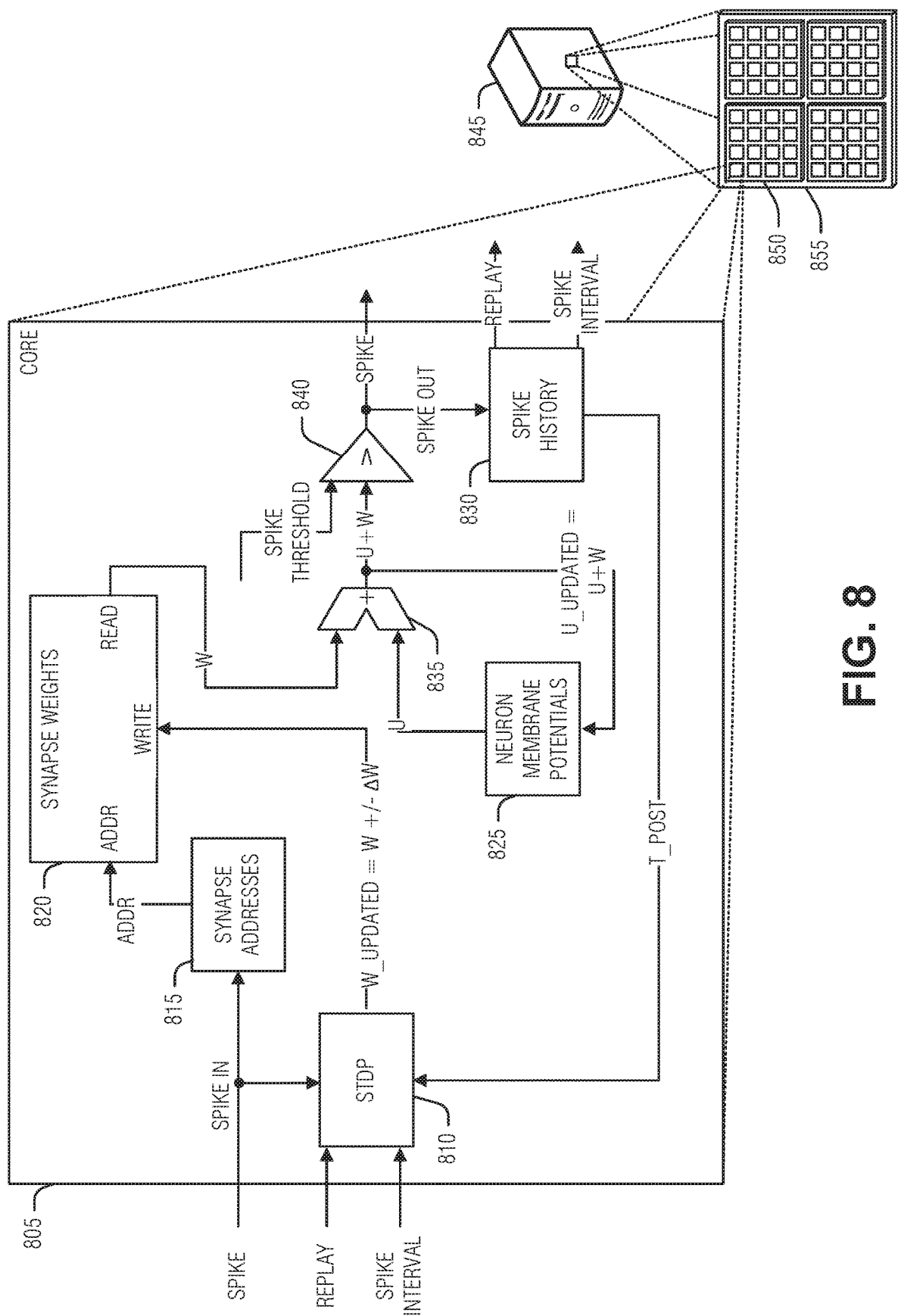
FIG. 8 is a high-level diagram of a model neural core structure, according to an embodiment.

FIGS. 8-11 illustrate neuromorphic hardware, such as an example of a neural core and its operation. FIG. 8 is a high-level diagram of a model neural core structure, according to an embodiment. A neural-core 805 may be on a die with several other neural cores to form a neural-chip 850. Several neural-chips may also be packaged and networked together to form the neuromorphic hardware 855, which may be included in any number of devices 845, such as servers, mobile devices, sensors, actuators, etc. The illustrated neural-core structure functionally models the behavior of a biological neuron. A signal is provided at an input (e.g., ingress spikes, spike in, etc.) to a synapse (e.g., modeled by the synaptic variable memory 820) that may include a fan-out within the core to other dendrite structures with appropriate weight and delay offsets (e.g., represented by the synapse addresses 815 to identify to which synapse a dendrite corresponds). The signal may be modified by the synaptic variable memory 820 (e.g., synaptic weights may be applied to spikes addressing respective synapses) and made available to the neuron model (the combination of the neuron membrane potentials 825 multiplexed 835 with the weighted spike and compared 840 to the neuron's potential to produce an output spike (e.g., egress spikes via an axon to one or several destination cores) based on weighted spike states.

In an example, a neuromorphic computing system may employ STDP learning. Here, a network of neural network cores communicate via short packetized spike messages sent from core to core. Each core may implement some number of neurons, which operate as primitive nonlinear temporal computing elements. When a neuron's activation exceeds some threshold level, it generates a spike message that is propagated to a set of fan-out neurons contained in destination cores. In managing its activation level, a neuron may modify itself (e.g., modify synaptic weights) in response to a spike. These operations may model a number of time-dependent features. For example, following a spike, the impact of PRE spike may decay in an exponential manner. This exponential decay, modeled as an exponential function, may continue for a number of time steps, during which additional spikes may or may not arrive.

Thus, the neural-core 805 may include a memory block (e.g., static random access memory (SRAM)) holding synaptic weights 820, a memory block for neuron membrane potentials 825, integration logic 835, thresholding logic 840, on-line learning and weight update logic based on the STDP logic 810, and a spike history buffer 830. The various components of the neural-core 805—such as the integration logic 835, thresholding logic 840, and the STDP logic 810—are implemented in hardware. This hardware may be one or more of central processing units (CPUs), graphics processing units (GPUs), digital signal processors (DSPs), application specific integrated circuits (ASICs), execution units, etc., as described below with respect to FIG. 13. Further, this hardware may be augmented, configured, or otherwise directed by software (e.g., firmware) to implement any of these components.

When a spike from a pre-synaptic neuron is received, the synaptic weight is accessed and is added to the post-synaptic neuron's membrane potential (u). An outgoing spike is generated if the updated (u) is larger than a pre-set spike threshold. The outgoing spike resets a spike history buffer, which counts how many time-steps have passed since the last time each neuron in the core has spiked ($t_{POST}$).

The neural-core may implement at least three on-line (e.g., in chip) learning operations performed in the proposed core: LTD, single PRE spike LTP, and multiple PRE spike LTP (LTP'). As noted above, LTD occurs when the PRE spike arrives after a POST spike. Here, the STDP logic 810 receives the spike signal and computes $\Delta t = t_{POST} - t\_PRE$, where $t_{POST}$ is retrieved from the spike history 830 and $t_{PRE}$ is the time-step in which the PRE spike was received. A pre-defined STDP procedure computes the change in synapse weight $\Delta w$ as a function of $\Delta t$ and decrements the appropriate synaptic weight w.

For LTP and LTP', PRE neural-core's spike history counter triggers a REPLAY spike T time-steps after a corresponding PRE spike. Here, T is the maximum STDP time interval. The STDP logic 810 receives the REPLAY spike and computes $\Delta t = T - (t_{REPLAY} - t_{POST})$, where T is the received maximum STDP time interval, $t_{REPLAY}$ is the current time-step, and $t_{POST}$ is retrieved from the spike history 830. Again, a pre-defined STDP operation computes $+\Delta w$ as a function of $\Delta t$ and increments the appropriate synaptic weight w by $\Delta w$.

When a PRE neuron spikes twice within the maximum STDP interval, a REPLAY spike may be sent only for the last PRE spike. In case the last PRE spike is in fact an LTD spike, which is unknowable to the PRE neuron, the PRE neuron may direct POST neurons to perform the LTP and LTD in parallel by including a time difference between PRE spikes in the REPLAY spike. The PRE neuron asserts both spike and replay signals, and sends the number of time-steps between PRE spikes as the time interval T'. LTD is performed as described above when the PRE spike is received. The STDP logic 810 uses T' to compute the LTP component of the synaptic weight update. Thus, LTP' may include the w updates coming from both LTD and LTP such that $\Delta w = (\Delta w * LTP) + (-\Delta w - LTD)$, and the appropriate weight w is updated by the resulting $\Delta w$.

The new synaptic weights, as computer by $\Delta w$, are installed in the synaptic memory 820 to modify (e.g., weight) future PRE spikes, thus modifying the likelihood that a particular combination of PRE spikes causes a POST spike. The network distributes the spike messages to destination neurons and, in response to receiving a spike message, those neurons update their activations in a transient, time-dependent manner, similar to the operation of biological neurons.

In an example, the neural-core 805 is arranged to receive, at a first time, a first spike from a second neuron (e.g., PRE neuron). In an example, the neural-core 805 does not have a memory for received spikes (e.g., there is no record of PRE spikes to later perform LTP). In an example, the neural-cores 850 are connected by a network fabric that does not include a connection from the first neuron to the second neuron (e.g., there is no back-propagation possible).

The neural-core 805 is arranged to produce a second spike at a second time after the first time. This is a POST spike. The neural-core 805 is arranged to receive, at a third time after the second time, a third spike from the second neuron. Here, the third spike is a replay of the first spike (e.g., REPLAY spike) with a defined time offset. In an example, the defined time offset is measured in a number of time-steps for the neuromorphic hardware 855 That is, the neuromorphic hardware 855 defines time as environmental increments (e.g., it may not correspond with external time) and also defines how many of these increments constitutes the defined time offset. In an example, the defined time offset is a maximum STDP time interval used for learning in the neuromorphic hardware 855. In an example, the third spike includes an indication that it is a replay of the first spike. Thus, the neural-core 805 may discern that it is a REPLAY spike by looking at the indication alone.

The neural-core 805 is arranged to perform LTP for the first spike using the third spike. In an example, to perform LTP, the neural-core 805 is arranged to calculate a time interval by which the first spike precedes the second spike, and use the time interval to adjust a synapse that received the first spike (e.g., to which the first spike was addressed). In an example, to calculate the time interval, the neural-core 805 is arranged to subtract the third time from the second time to produce a result, and subtract the result from the maximum STDP time interval used for learning in the neuromorphic hardware 855.

In an example, the neural-core 805 is arranged to receive, at a fourth time prior to the first time, a fourth spike from the second neuron within the defined time offset. Here, LTP performance for the first spike is unaffected by the fourth spike because a replay of the fourth spike was replaced by the replay of the first spike. This is an implementation of the multiple LTP PRE spikes described above.

In an example, the neural-core 805 is arranged to receive, at a fourth time, a fourth spike from the second neuron; produce a fifth spike at a fifth time after the first time; receive, at a sixth time after the fifth time, a sixth spike from the second neuron; receive, at a seventh time after the sixth time, a seventh spike from the second neuron—the seventh spike being a replay of the sixth spike, and the seventh spike including a time delta between the fourth spike and the sixth spike; and perform LTP for the fourth spike using the time delta of the seventh spike. In an example, LTD is performed for the sixth spike. In an example, LTP and LTD are performed in parallel. This is an implementation of the scenario in which multiple PRE spikes are transmitted within the STDP interval, with one PRE spike preceding the POST spike (resulting in LTP) and one PRE spike following the POST spike (resulting in LTD).

As noted above, the A neural-core 805 may be on a die with one or more other neural cores to form a neural-chip 850. One or more neural-chips may also be packaged and networked together to form the neuromorphic hardware 855, which may be included in any number of devices 845, such as servers, mobile devices, sensors, actuators, etc. The neuromorphic hardware 855 enables one or more SNNs to be used by the device 845 for a variety of tasks. For example, the device 845 may be a security camera that implements facial recognition using an SNN implemented in the neuromorphic hardware 855. Although the neuromorphic hardware 855 may operate as the primary, or sole, processor of the device 845, in other embodiments the neuromorphic hardware 855 may operate as a co-processor (e.g., neural network accelerator) to a primary processor in a system such as that described below with respect to FIG. 13. In this latter arrangement, the neuromorphic hardware 855 is generally provided with raw data to classify by other components of the device 845—such as a CPU, hardware drivers or interfaces, etc.—and produces classifications for the data that may then be used for other purposes. For example, audio may be received at a sensor of the device 845 and routed directly to the neuromorphic hardware 855. The neuromorphic hardware 855 implements an SNN trained to detect phonemes in the audio and provides real-time classifications of the phonemes, for example, to a memory buffer. A program running on the CPU of the device 845 may retrieve the phonemes from the memory buffer and produce a written transcript of spoken words from the phonemes. Because the pattern recognition and discrimination capabilities of neural networks have wide applicability, a wide variety of configurations may be used to address many use cases.

Figure 9A:
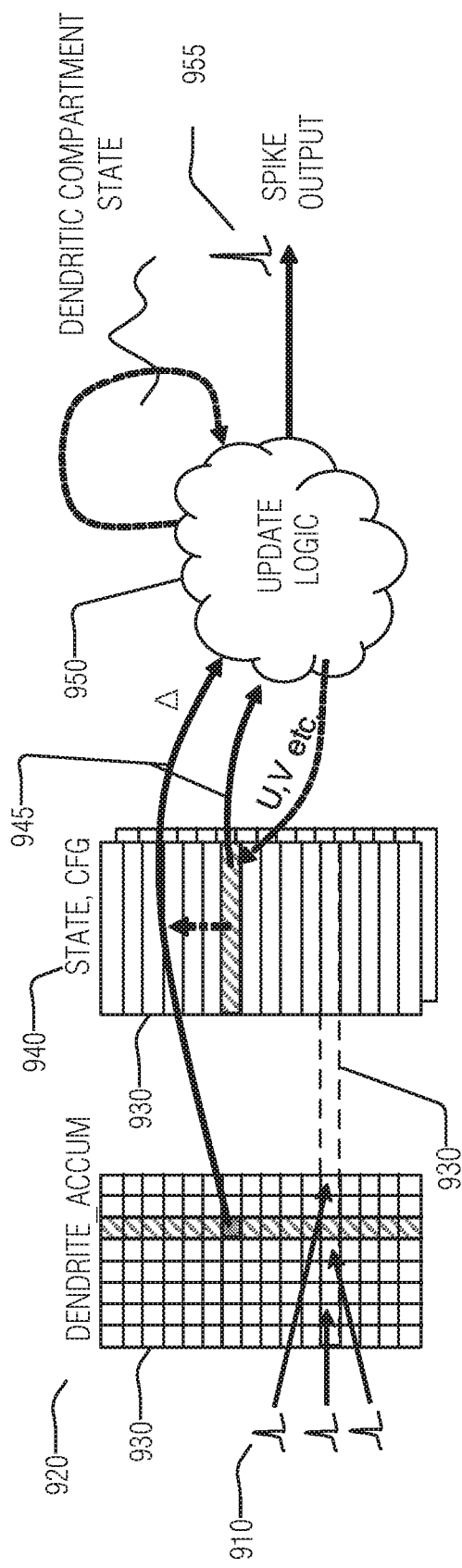
FIG. 9A is a pictorial diagram that illustrates a configuration of multi-compartment neurons and a dendritic accumulation process, according to an embodiment.

FIG. 9A is a pictorial diagram that illustrates a configuration of multi-compartment neurons and a dendritic accumulation process, according to an embodiment. The diagram of FIG. 9A illustrates a dendritic (e.g., post-synaptic within a modeled neuron) accumulation process for handling and scheduling spikes into the future inside a neural-core. Synaptic inputs 910 are provided to a dendrite accumulator structure 920, which may be configured as a dedicated data store, or a data structure allocated in a general data store, to maintain synaptic stimulation counters of weight values for a particular compartment 930. In the present context, a compartment 930 is an abstract neural unit that contains state and configuration variables 940 representing the dynamic state of a neuron. It is a component of a dendritic tree that may be processed in sequence with related compartments. Preserving some state information for a compartment 930 and passing it along as the compartments are processed provides for a broad class of information processing that may take place in the core.

A dendrite accumulator structure 920 may maintain synaptic stimulation counters of weight values for a particular compartment 930, with the compartment being a breakdown of a neural tree structure or simply an abstract neural unit. Each compartment 930 may have state variables (u, v) that represent a dynamic state of the neuron.

A sequential process with the update logic 950 may iterate through all of these compartments 930, receiving accumulated synaptic stimulation and state variables 945 from each of the compartments 930, and provide a spike output 955. Because this is a sequential process, the update logic 950 may preserve transient state information that is associated with each compartment by utilizing temporary register storage in the logic. By propagating this information according to the dataflow of a tree, the process may emulate the information processing of a biological dendritic tree.

Figure 9B:
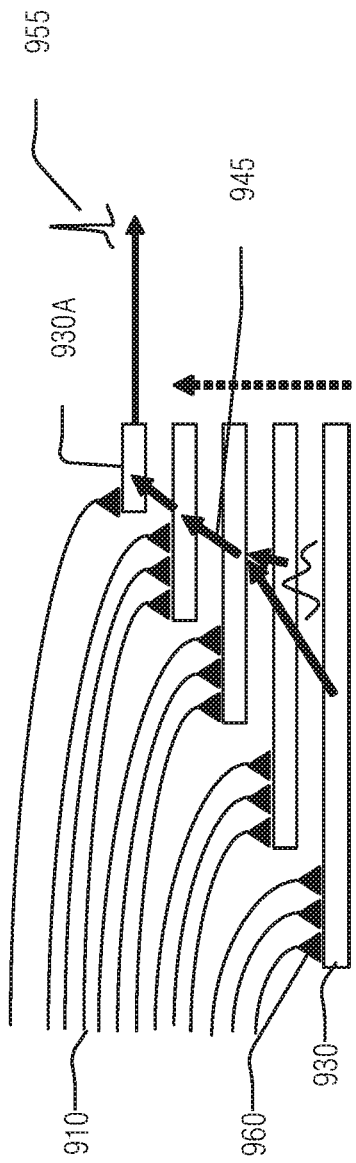
FIG. 9B is a pictorial diagram that shows a state structure of multiple compartments, according to an embodiment.

FIG. 9B is a pictorial diagram that shows a state structure of multiple compartments, according to an embodiment. FIG. 9B illustrates how a sequential iteration through the compartment indices 930 generally resembles a tree. Each of the rows 930 of this state structure, which may be memory addresses in the core's SRAMs, represents a compartment 930 that receives synaptic input 910, via synaptic connections 960. The core walks through these with numbers and state variables 945 being propagated from each of the compartments 930, up to one final route compartment 930A, which would be the soma (in the biological nomenclature), that provides a spike output 955. All of the other compartments 930 in FIG. 9B operate in a similar fashion and thereby transform and propagate the temporary dendritic state. Any dendrite index may be configured as either a compartment in the dendritic tree or a soma. Each compartment in the tree structure may transform and propagate the (u, v) state variables according to a real-value signal processing model, as described below.

FIG. 10A is a block diagram illustrating state dynamics for a dendritic compartment according to a simple neuron model, according to an embodiment. The dynamics for a dendritic compartment 1000A (use of the term "dendrite" below is to be construed synonymous with, and as shorthand for, the phrase "dendritic compartment") according to the simple neuron model, which is basically a discrete time filtering circuit. A first state variable operation 1010 may be performed that is based on a stored first state variable, in this example, the current U, and the spike input 910 received. A second state variable operation 1020 may then be subsequently performed that is based on a stored second state variable, in this example, the voltage V, and the output of the first variable operation 1010. A threshold function 1045 may be utilized to determine if the dendritic compartment 1000A should spike or at least indicate a spiking value even if it does not actually spike.

FIG. 10B is a block diagram illustrating state dynamics and the dendritic accumulation process for a dendritic compartment according to a multi-compartment neuron model, according to an embodiment. The dendritic compartments 1000B, 1000A may be, for example, the dendritic compartments 930 described above. The diagram of FIG. 10B is similar to the diagram in FIG. 10A, and a description of similar elements will not be repeated. However, in the design shown in FIG. 10B, to enhance the design for the multi-compartment processing, two points $J_U$ 1030, $J_V$ 1032, have been added in the logic where information coming from earlier compartments A, B 1040 in the sequential process may be joined.

As an example, a neuron may be stimulated with both excitatory and inhibitory input, each with its own exponential filtering time constant. This spiking neuron model and networks of these neurons may be capable of implementing powerful neural information processing algorithms (e.g., E/I networks).

With the multi-compartment support described herein, an E/I neuron may be constructed out of two primitive units, one that integrates the 'E' input with the $\tau_E$ time constant, the other the 'I' input with $\tau_I$ time constant. In another example, a more complex single neuron model may include the complexity of the E/I neuron implementation. Since many neuromorphic algorithms may not need this complexity, the presently described architecture provides a flexible and efficient neuromorphic processing solution. The architecture may be generalized to an extremely flexible neuromorphic neuron processor that may, through programming, implement conventional neuron models (some with potentially significant value for machine learning applications).

The structure described above provides a way to join in, as in a tree structure, the earlier input A, B 1040 on towards the leaves of a dendritic tree. In each of these join operations $J_U$ 1030, $J_V$ 1032, there are two state variables u (current) and v (voltage), which are two dynamic variables that are interlinked. Because there are two such variables in this example, there are two different join possibilities (join points in the signal flow) 1030, 1032.

The current from the earlier input 1040 may be provided at a first junction point 1030, and the voltage from the earlier input 1040 may be provided at a second junction point 1032. A spike function 1022 may determine if a spike threshold value has been reached to determine whether to send a spike S 1055 (or value representative of a spike), and furthermore, a value Y 1050 (i.e., one or more numbers representing state variables of the dendritic compartment 1000B) that includes further information in a form of continuous data related to the current state of the dendritic compartment 1000B.

In biology, an efficiency may be realized by communicating numbers 1050 (i.e., continuous data) as opposed to just binary spike values 1055. The generation of neural networks that is focused on spiked base signaling is largely driven by the efficiency that comes from long-range parallel communication using a minimum of information for energy and performance efficiency. Although it is possible to process a large space of algorithmic problems with a spike based signaling methodology, this approach only goes so far. There is still value in communicating numbers 1050 as opposed to just binary spike events 1055 with temporal codes, specifically when the communication is sufficiently local. Biological neurons use their dendritic trees for this purpose. A dendritic tree may be viewed as a spatially local region of the neuron over which it is efficient to send continuous current or voltage values across the membrane of the neuron.

A series of join operations may be provided that are similar to an instruction set that the core supports. For example, one might add the u variable along with an input from another compartment. Or, instead of an add operation, a multiply operation may be used as the join operation. One could also include, for example, an AND of a spiking condition of whether the input compartment is past its threshold or not, and then whether this compartment's v has passed its threshold or not—one could take the AND condition of those two, or the OR condition of those two. There are a number of different operations that may be defined.

The structure that includes information from other compartments gives the dendritic tree structure a large amount of computational capability, compared to either a conventional feed-forward Artificial Neural Network models or a pure spike-based network. This creates a very flexible interlinked dynamic system of these differential equation state variables. The design allows backwards, event-driven sequential traversal of the sequential units to propagate spiking information back to the synapses for synaptic plasticity (e.g., weight updates according to STDP rules), although this is not necessary when implementing REPLAY spikes.

Figure 11:
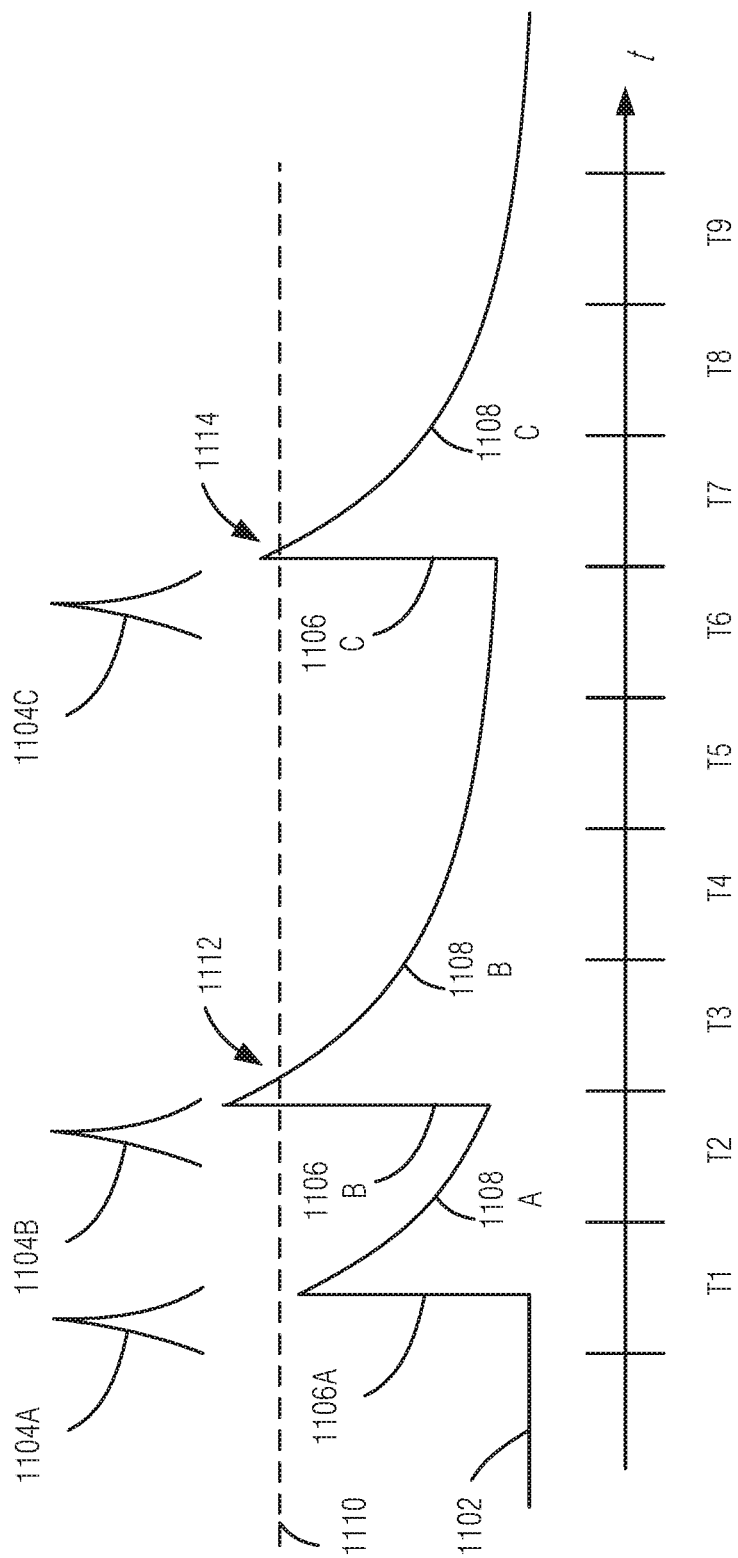
FIG. 11 is a simplified timing diagram illustrating a trace variable as a function of time, according to an example use case, according to an embodiment.

FIG. 11 is a simplified timing diagram illustrating a trace variable 1102 as a function of time, according to an embodiment. This trace variable 1102 represents the time a PRE spike arrives, such as Δt. For the sake of simplicity and ease of illustration, trace variable 1102 is depicted as a continuous function over time periods T1-T9, though in a practical embodiment, each time period T1-T9 may contain 50-100 actual discrete time increments, and the value of trace variable 1102 would remain constant for the duration of each individual time step.

Input stimuli 1104A, 1104B, and 1104C (collectively referenced as input events 1104) are shown as impulses, which may be spikes at the input or output of the neuron. Input events 1104 may vary in their weighting in some implementations. Each input stimulus 1104A-1104C causes a response in the neuron that ultimately affects the trace variable 1102. In the example depicted, each input stimulus causes a step change in the positive direction, indicated at 1106A, 1106B, and 1106C, followed by an exponential decay as indicated at 1108A, 1108B, and 1108C. The exponential decay 1108 follows an exponential curve that may be defined with a time constant T. The neuron may be configured with an activation threshold 1110 which, when exceeded by the trace variable (as depicted at 1112 and 1114), may cause a corresponding activation response, such as an output spike or a change in the neuron's input weight or threshold (not shown). The resulting trace is a filtered temporal spike train trace.

A basic computation of each exponential decay function over n time increments may be expressed as $x_n = x_0 \alpha^n$, where $x_0$ represents the initial value, and α is a decay factor that corresponds to the time constant τ of the exponential function. As a basic approach, n multiplication operations would be computed. However, according to some embodiments, an N-bit expression of n may be represented in binary as $n = \sum_{i=0}^{N} n_i 2^i$, where $n_i$ represents the binary value for each bit position i. Advantageously, this computational technique reduces the $x_n$ computation to at most $[\log_2 n]$ multiplication operations according to $x_n = x_0 \Pi_{i | n_i = 1} \alpha^{2^i}$. In an example, a quantity N constants of $\alpha^{2^i}$ are pre-computed and stored in a data store to be looked up rather than computed for improved computational efficiency.

In an example, the neuron performs a delayed computation of the exponential decay function at the time when the decayed value of the exponential decay function is to be used for processing or decision-making, such as in response to an input stimulus. Thus, during the time increments when there are no input stimuli, the neuron engine is free from having to compute the exponential decay of the trace variable. This relieves the system from having to expend energy and computational resources, particularly when a delayed computation of the decayed result may be performed with fewer operations, as exemplified above. In performing the delayed exponential decay computation, the time increments during which the function experienced decay are taken into account.

Figure 12:
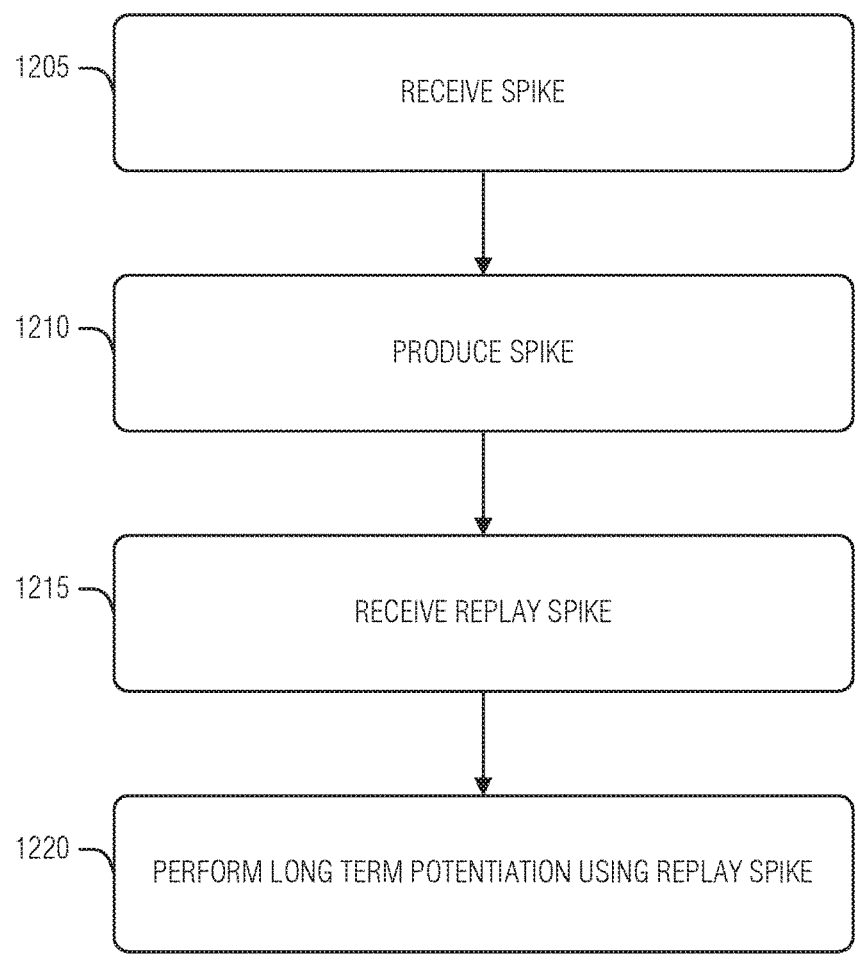
FIG. 12 illustrates a flow diagram of an example of a method for STDP in neuromorphic hardware, according to an embodiment.

FIG. 12 illustrates a flow diagram of an example of a method 1200 for STDP in neuromorphic hardware, according to an embodiment. The operations of the method 1200 are performed by computer hardware, such as that described above (e.g., neuromorphic hardware), or below (e.g., processing circuitry).

At operation 1205, at a first neuron at a first time, a first spike is received from a second neuron. Here, the first neuron and the second neuron are in neuromorphic hardware. In an example, the neuromorphic hardware includes a set of neural-core structures, each neural-core structure simulating a set of neurons with the first neuron and the second neuron being implemented in a neural-core structure of the set of neuro-structures. In an example, the neural-core structures do not have a memory for received spikes. In an example, the neural-core structures are connected by a network fabric that does not include a connection from the first neuron to the second neuron.

At operation 1210, at the first neuron, a second spike is produced at a second time after the first time.

At operation 1215, at the first neuron at a third time after the second time, a third spike is received from the second neuron. Here, the third spike is a replay of the first spike with a defined time offset (e.g., the third spike was sent the defined time offset after the first spike). In an example, the defined time offset is measured in a number of time-steps for the neuromorphic hardware. In an example, the defined time offset is a maximum STDP time interval used for learning in the neuromorphic hardware. In an example, the third spike includes an indication that it is a replay of the first spike.

At operation 1220, the first neuron performs LTP for the first spike using the third spike. In an example, performing LTP includes calculating a time interval by which the first spike precedes the second spike, and using the time interval to adjust a synapse that received the first spike. In an example, calculating the time interval includes subtracting the third time from the second time to produce a result and then subtracting the result from the maximum STDP time interval used for learning in the neuromorphic hardware.

The operations above describe a typical single PRE spike LTP operation using the REPLAY spike of the PRE spike. The method 1200 may be extended for multiple PRE spikes as well. In an example, the method 1200 includes receiving—at the first neuron at a fourth time prior to the first time—a fourth spike from the second neuron within the defined time offset. Here, performing LTP for the first spike in unaffected by the fourth spike, a replay of the fourth spike from the second neuron being replaced by the replay of the first spike. Thus, the fourth spike preceded the first spike in time, and thus its replay was replaced by the replay of the first spike.

The method 1200 may also address the scenario in which one of multiple PRE spikes precedes the POST spike and one PRE spike follows the POST spike. Thus, at the first neuron at a fourth time, a fourth spike is received from the second neuron. The first neuron produces a fifth spike at a fifth time after the first time and receives, at a sixth time after the fifth time, a sixth spike from the second neuron. The first neuron then receives, at a seventh time after the sixth time, a seventh spike from the second neuron, the seventh spike being a replay of the sixth spike. Here, the seventh spike includes a time delta between the fourth spike and the sixth spike. The first neuron may then perform LTP for the fourth spike using the time delta of the seventh spike. In an example, the first neuron performs LTD for the sixth spike using the sixth spike itself. In an example, LTP and LTD are performed in parallel.

Figure 13:
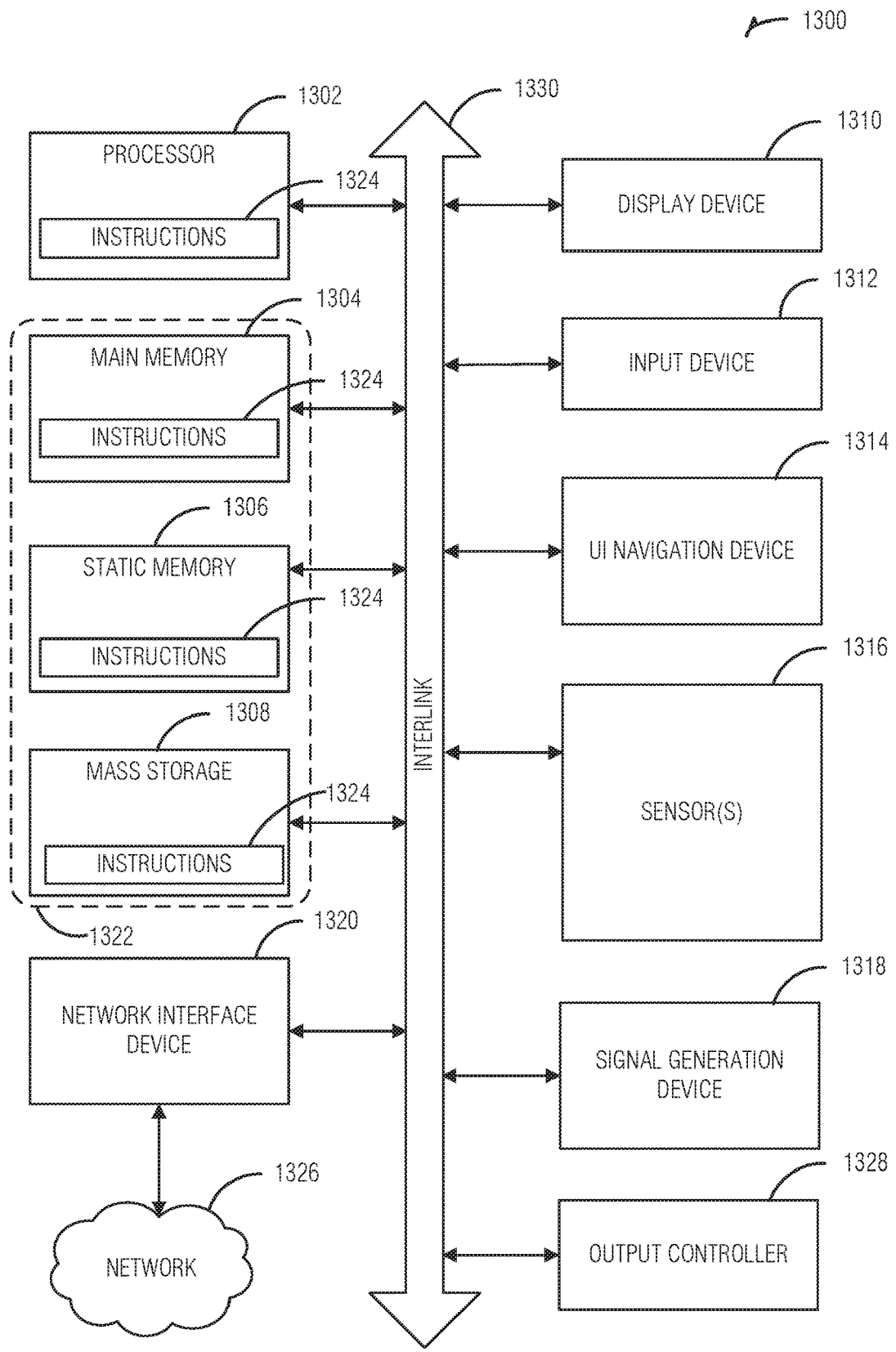
FIG. 13 is a block diagram illustrating an example of a machine upon which one or more embodiments may be implemented.

FIG. 13 illustrates a block diagram of an example machine 1300 upon which any one or more of the techniques (e.g., methodologies) discussed herein may perform. Examples, as described herein, may include, or may operate by, logic or a number of components, or mechanisms in the machine 1300. Circuitry (e.g., processing circuitry) is a collection of circuits implemented in tangible entities of the machine 1300 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1300 follow.

In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1300 may include a hardware processor 1302 (e.g., a central processing unit (CPU), a graphics processing unit (GPU), a hardware processor core, neuromorphic hardware, or any combination thereof), a main memory 1304, a static memory (e.g., memory or storage for firmware, microcode, a basic-input-output (BIOS), unified extensible firmware interface (UEFI), etc.) 1306, and mass storage 1308 (e.g., hard drive, tape drive, flash storage, or other block devices) some or all of which may communicate with each other via an interlink (e.g., bus) 1330. The machine 1300 may further include a display unit 1310, an alphanumeric input device 1312 (e.g., a keyboard), and a user interface (UI) navigation device 1314 (e.g., a mouse). In an example, the display unit 1310, input device 1312 and UI navigation device 1314 may be a touch screen display. The machine 1300 may additionally include a storage device (e.g., drive unit) 1308, a signal generation device 1318 (e.g., a speaker), a network interface device 1320, and one or more sensors 1316, such as a global positioning system (GPS) sensor, compass, accelerometer, or other sensor. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1302, the main memory 1304, the static memory 1306, or the mass storage 1308 may be, or include, a machine readable medium 1322 on which is stored one or more sets of data structures or instructions 1324 (e.g., software) embodying or utilized by any one or more of the techniques or functions described herein. The instructions 1324 may also reside, completely or at least partially, within any of registers of the processor 1302, the main memory 1304, the static memory 1306, or the mass storage 1308 during execution thereof by the machine 1300. In an example, one or any combination of the hardware processor 1302, the main memory 1304, the static memory 1306, or the mass storage 1308 may constitute the machine readable media 1322. While the machine readable medium 1322 is illustrated as a single medium, the term "machine readable medium" may include a single medium or multiple media (e.g., a centralized or distributed database, or associated caches and servers) configured to store the one or more instructions 1324.

The term "machine readable medium" may include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may be further transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 1402.11 family of standards known as Wi-Fi®, IEEE 1402.16 family of standards known as WiMax®), IEEE 1402.15.4 family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1300, and includes digital or analog communications signals or other intangible medium to facilitate communication of such software. A transmission medium is a machine readable medium.

FIGS. 14 through 23 illustrate several additional examples of hardware structures or implementations that may be used to implement computer hardware.

Figure 14:
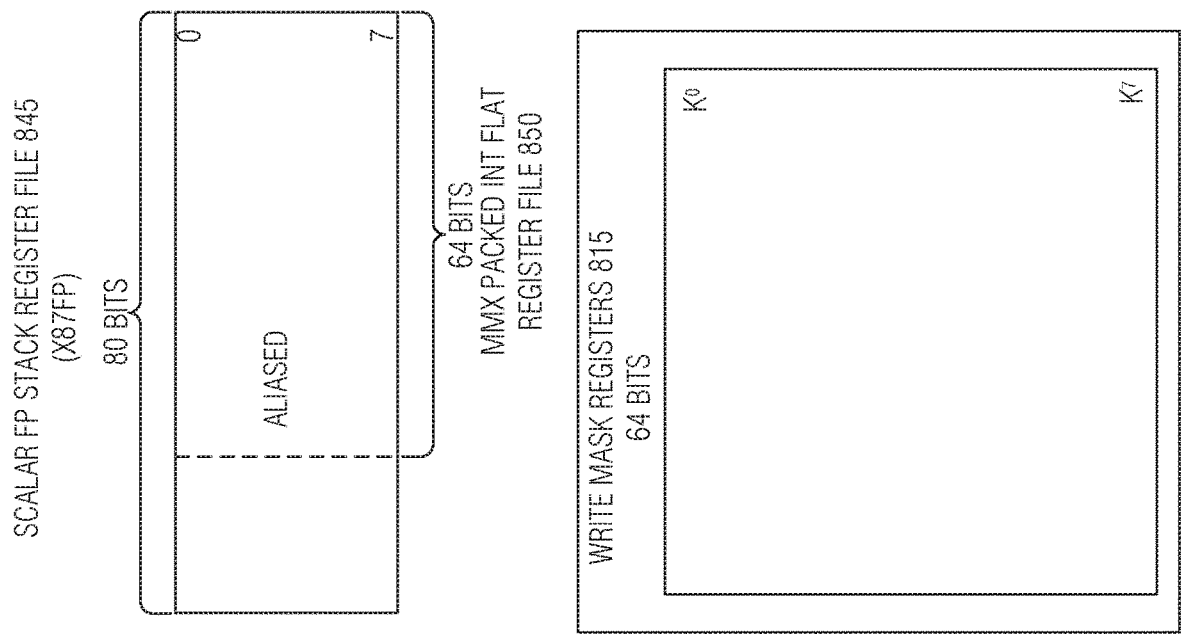
FIG. 14 is a block diagram of a register architecture according to one embodiment of the invention.
Figure 14:
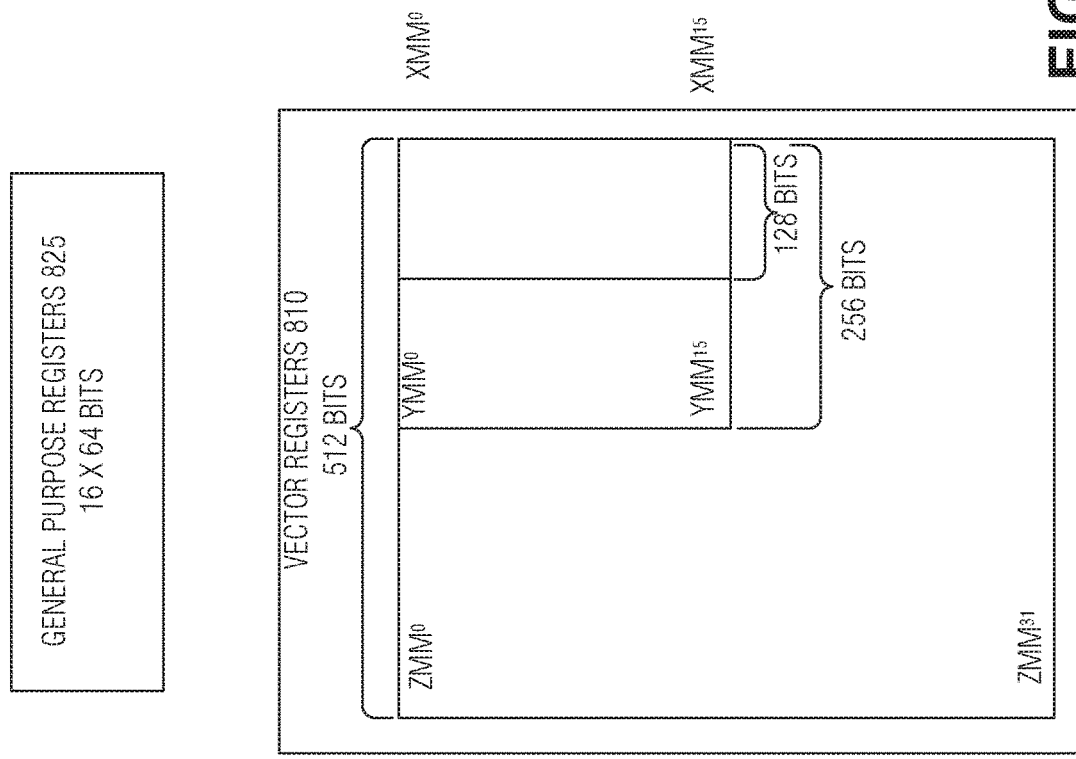

FIG. 14 is a block diagram of a register architecture 1400 according to one embodiment of the invention. In the embodiment illustrated, there are 32 vector registers 1410 that are 512 bits wide; these registers are referenced as zmm0 through zmm31. The lower order 556 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 1415—in the embodiment illustrated, there are 8 write mask registers (k0 through k7), each 64 bits in size. In an alternate embodiment, the write mask registers 1415 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1445, on which is aliased the MMX packed integer flat register file

1450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Figure 15:
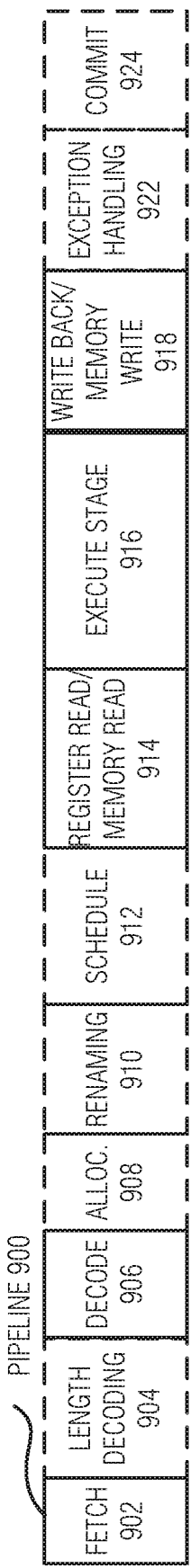
FIG. 15 is a block diagram illustrating both an exemplary in-order pipeline and an exemplary register renaming, out-of-order issue/execution pipeline according to embodiments of the invention.

FIG. 15 is a block diagram illustrating both an exemplary in-order pipeline and an exemplary register renaming, out-of-order issue/execution pipeline according to embodiments of the invention. FIG. 10 is a block diagram illustrating both an exemplary embodiment of an in-order architecture core and an exemplary register renaming, out-of-order issue/execution architecture core to be included in a processor according to embodiments of the invention. The solid lined boxes in FIG. 15 illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

Figure 16:
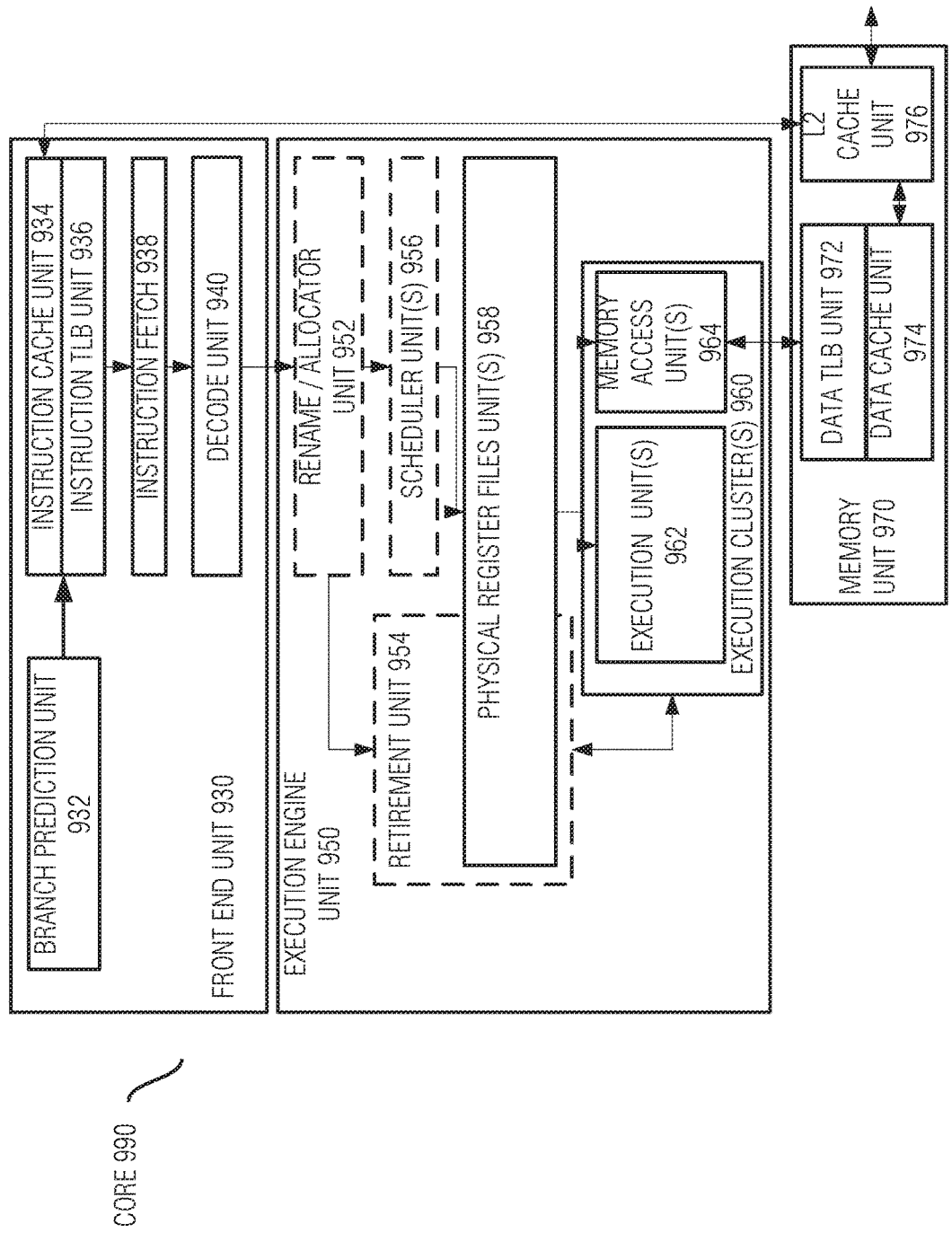
FIG. 16 is a block diagram illustrating both an exemplary embodiment of an in-order architecture core and an exemplary register renaming, out-of-order issue/execution architecture core to be included in a processor according to embodiments of the invention.

FIG. 16 shows processor core 1590 including a front end unit 1530 coupled to an execution engine unit 1550, and both are coupled to a memory unit 1570. The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit 1540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1590 includes a microcode ROM or other medium that stores microcode for certain macroinstructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1558 comprises a vector registers unit, a write mask registers unit, and a scalar registers unit. These register units may provide architectural vector registers, vector mask registers, and general purpose registers. The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one exemplary embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory.

By way of example, the exemplary register renaming, out-of-order issue/execution core architecture may implement the pipeline 1500 as follows: 1) the instruction fetch 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514; the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1534/1574 and a shared L2 cache unit 1576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 17B:
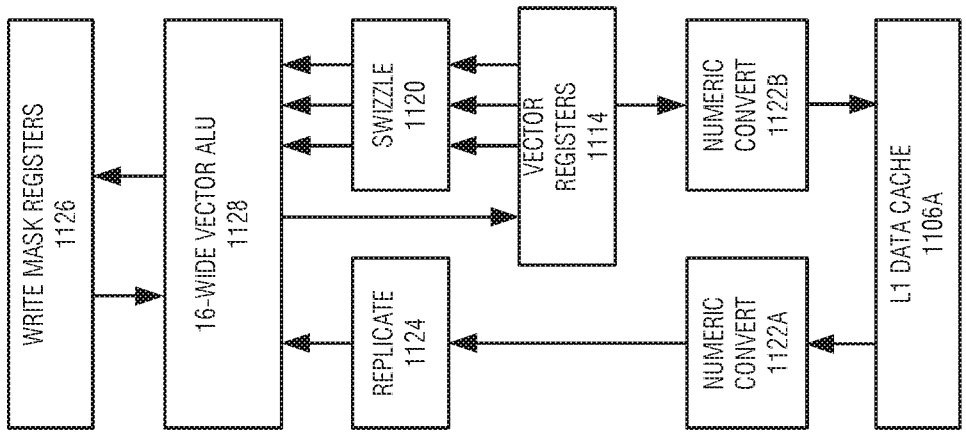
FIGS. 17A-B illustrate a block diagram of a more specific exemplary in-order core architecture, which core would be one of several logic blocks (including other cores of the same type and/or different types) in a chip.
Figure 17A:
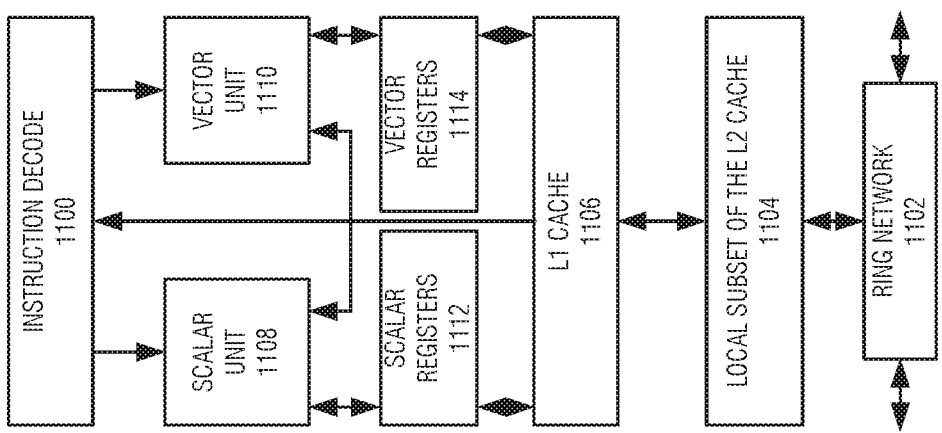

FIGS. 17A-17B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 17A is a block diagram of a single processor core, along with its connection to the on-die interconnect network 1702 and with its local subset of the Level 2 (L2) cache 1704, according to embodiments of the invention. In one embodiment, an instruction decoder 1700 supports the x86 instruction set with a packed data instruction set extension. An L1 cache 1706 allows low-latency accesses to cache memory into the scalar and vector units. While in one embodiment (to simplify the design), a scalar unit 1708 and a vector unit 1710 use separate register sets (respectively, scalar registers 1712 and vector registers 1714) and data transferred between them is written to memory and then read back in from a level 1 (L1) cache 1706, alternative embodiments of the invention may use a different approach (e.g., use a single register set or include a communication path that allow data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and may be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network is bi-directional to allow agents such as processor cores, L2 caches and other logic blocks to communicate with each other within the chip. Each ring data-path is 512-bits wide per direction.

FIG. 17B is an expanded view of part of the processor core in FIG. 17A according to embodiments of the invention. FIG. 17B includes an L1 data cache 1706A part of the L1 cache 1704, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Figure 18:
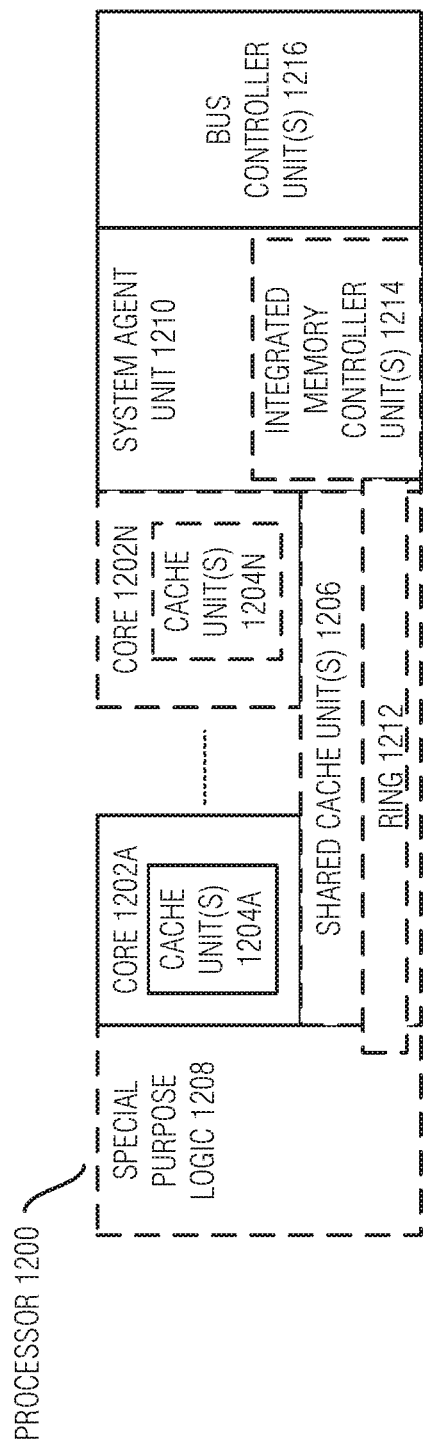
FIG. 18 is a block diagram of a processor that may have more than one core, may have an integrated memory controller, and may have integrated graphics according to embodiments of the invention.

FIG. 18 is a block diagram of a processor 1800 that may have more than one core, may have an integrated memory controller, and may have integrated graphics according to embodiments of the invention. The solid lined boxes in FIG. 18 illustrate a processor 1800 with a single core 1802A, a system agent 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (LA), or other levels of cache, a last level cache (LLC), and/or combinations thereof. While in one embodiment a ring based interconnect unit 1812 interconnects the integrated graphics logic 1808, the set of shared cache units 1806, and the system agent unit 1810/integrated memory controller unit(s) 1814, alternative embodiments may use any number of well-known techniques for interconnecting such units. In one embodiment, coherency is maintained between one or more cache units 1806 and cores 1802-A-N.

In some embodiments, one or more of the cores 1802A-N are capable of multi-threading. The system agent 1810 includes those components coordinating and operating cores 1802A-N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

The cores 1802A-N may be homogenous or heterogeneous in terms of architecture instruction set; that is, two or more of the cores 1802A-N may be capable of execution the same instruction set, while others may be capable of executing only a subset of that instruction set or a different instruction set.

FIGS. 19-22 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 19:
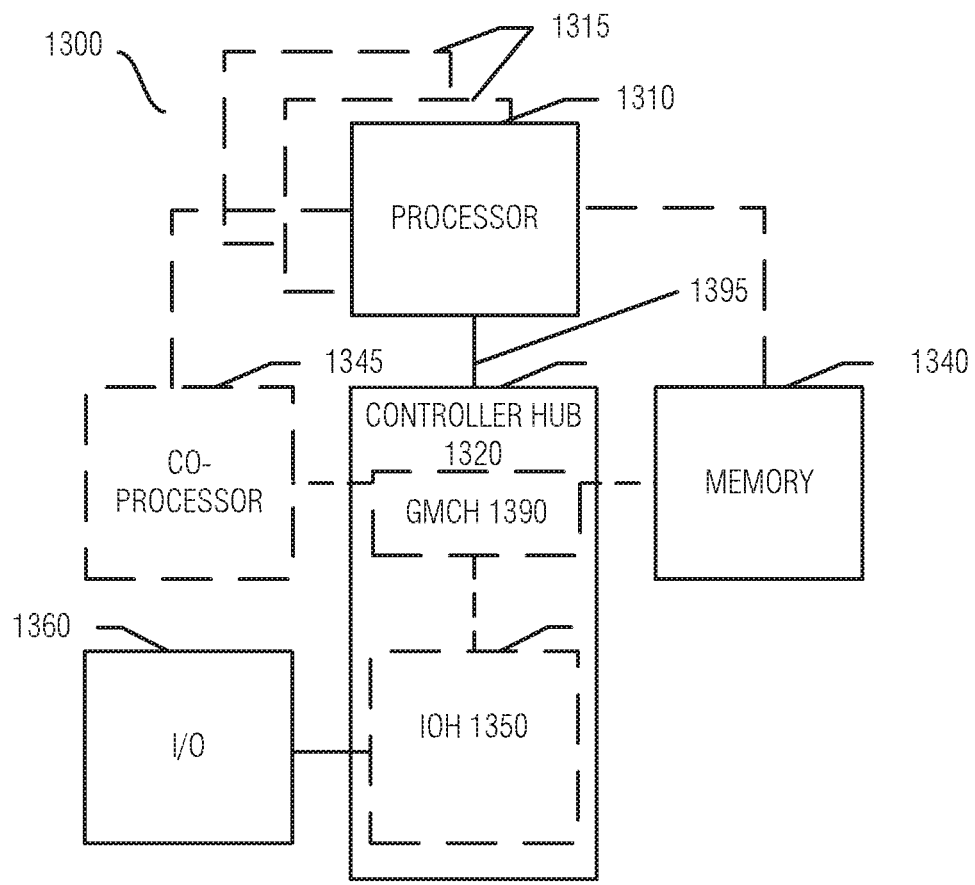
FIGS. 19-22 are block diagrams of exemplary computer architectures.

Referring now to FIG. 19, shown is a block diagram of a system 1900 in accordance with one embodiment of the present invention. The system 1900 may include one or more processors 1910, 1915, which are coupled to a controller hub 1920. In one embodiment the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 is couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface such as QuickPath Interconnect (QPI), or similar connection 1995.

In one embodiment, the coprocessor 1945 is a special-purpose processor, such as, for example, a high-throughput MIC processor, a network or communication processor, compression engine, graphics processor, GPGPU, embedded processor, or the like. In one embodiment, controller hub 1920 may include an integrated graphics accelerator.

There may be a variety of differences between the physical resources 1910, 1915 in terms of a spectrum of metrics of merit including architectural, microarchitectural, thermal, power consumption characteristics, and the like.

In one embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Figure 20:
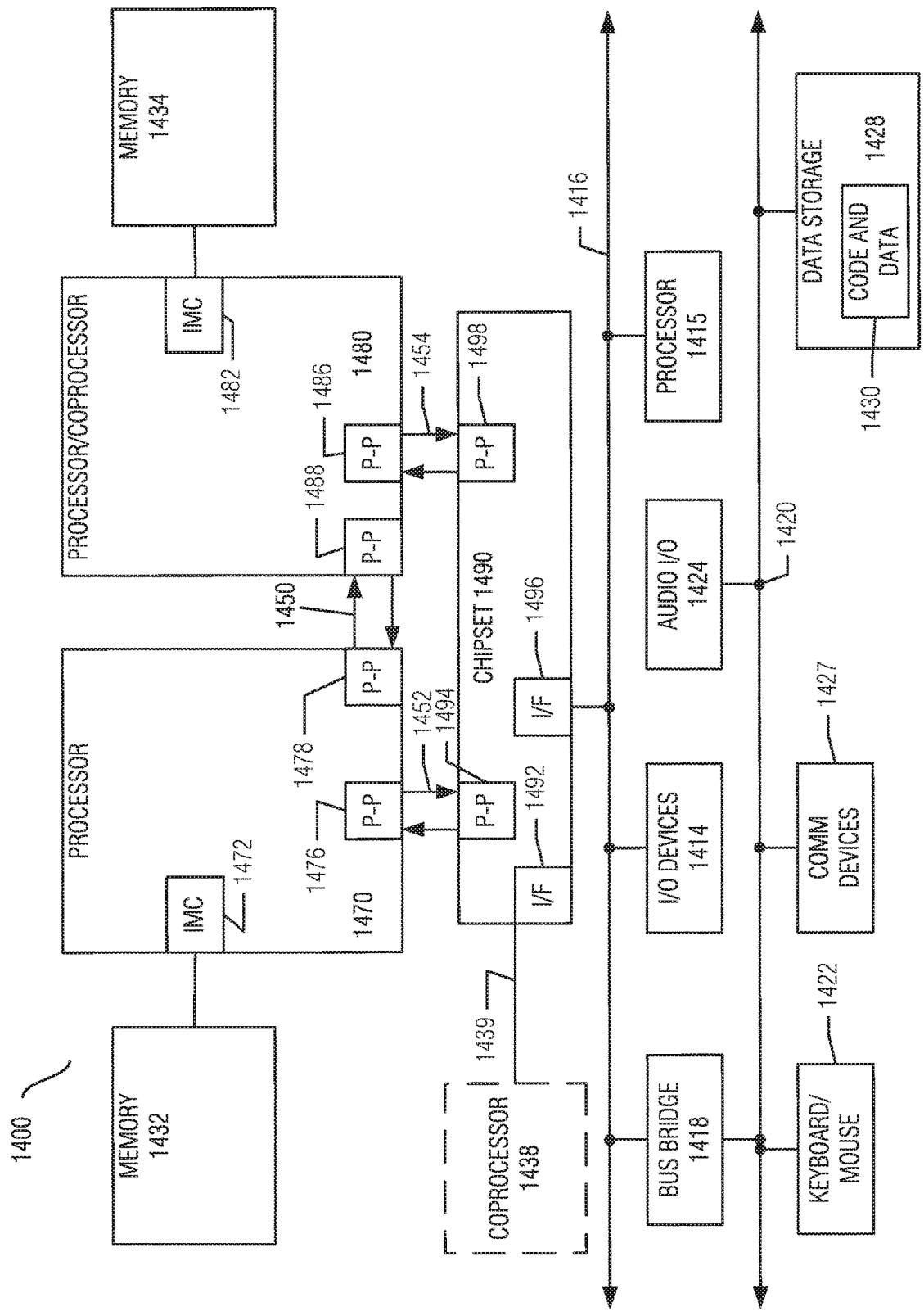

Referring now to FIG. 20, shown is a block diagram of a first more specific exemplary system 2000 in accordance with an embodiment of the present invention. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In one embodiment of the invention, processors 2070 and 2080 are respectively processors 1910 and 1915, while coprocessor 2038 is coprocessor 1945. In another embodiment, processors 2070 and 2080 are respectively processor 1910 coprocessor 1945.

Processors 2070 and 2080 are shown including integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2039. In one embodiment, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2090 may be coupled to a first bus 2016 via an interface 2096. In one embodiment, first bus 2016 may be a Peripheral Component Interconnect (PCI) bus, or a bus such as a PCI Express bus or another third generation I/O interconnect bus, although the scope of the present invention is not so limited.

As shown in FIG. 20, various I/O devices 2014 may be coupled to first bus 2016, along with a bus bridge 2018 which couples first bus 2016 to a second bus 2020. In one embodiment, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In one embodiment, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in one embodiment. Further, an audio I/O 2024 may be coupled to the second bus 2020. Note that other architectures are possible. For example, instead of the point-to-point architecture of FIG. 20, a system may implement a multi-drop bus or other such architecture.

Figure 21:
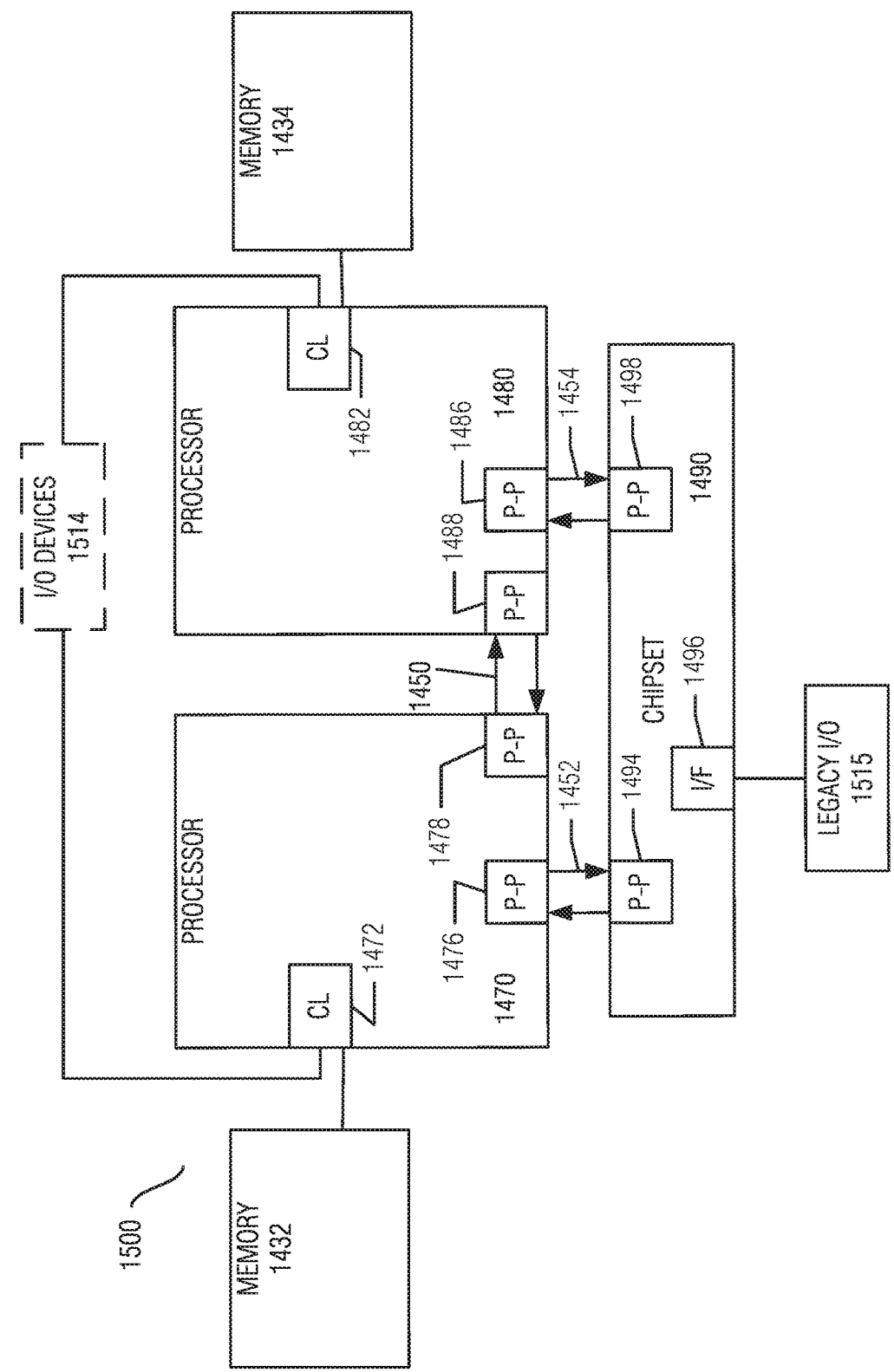

Referring now to FIG. 21, shown is a block diagram of a second more specific exemplary system 2100 in accordance with an embodiment of the present invention. Like elements in FIGS. 20 and 15 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2072 and 2082, respectively. Thus, the CL 2072, 2082 include integrated memory controller units and include I/O control logic. FIG. 21 illustrates that not only are the memories 2032, 2034 coupled to the CL 2072, 2082, but also that I/O devices 2114 are also coupled to the control logic 2072, 2082. Legacy I/O devices 2115 are coupled to the chipset 2090.

Figure 22:
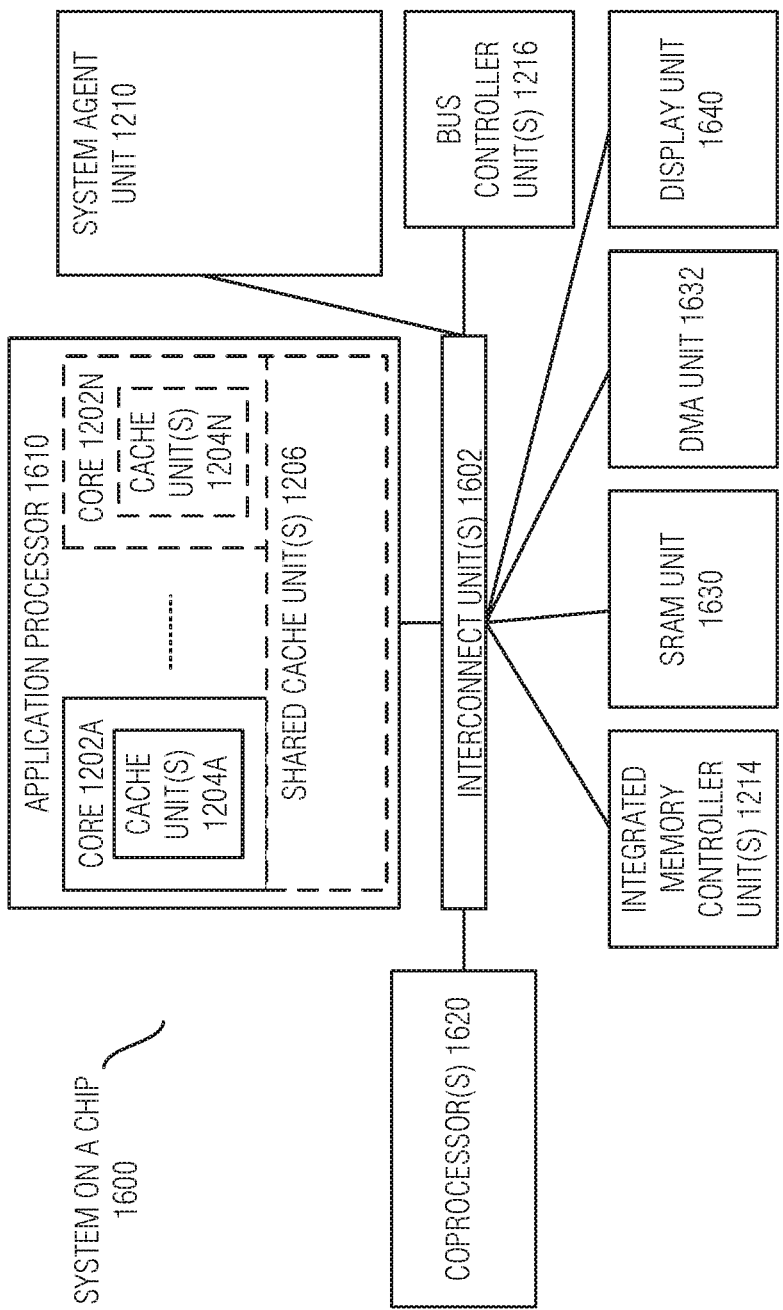

Referring now to FIG. 22, shown is a block diagram of a SoC 2200 in accordance with an embodiment of the present invention. Similar elements in FIG. 18 bear like reference numerals. Also, dashed lined boxes are optional features on more advanced SoCs. In FIG. 22, an interconnect unit(s) 2202 is coupled to: an application processor 2210 which includes a set of one or more cores 502A-N and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; an static random access memory (SRAM) unit 2230; a direct memory access (DMA) unit 2232; and a display unit 2240 for coupling to one or more external displays. In one embodiment, the coprocessor(s) 2220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 23:
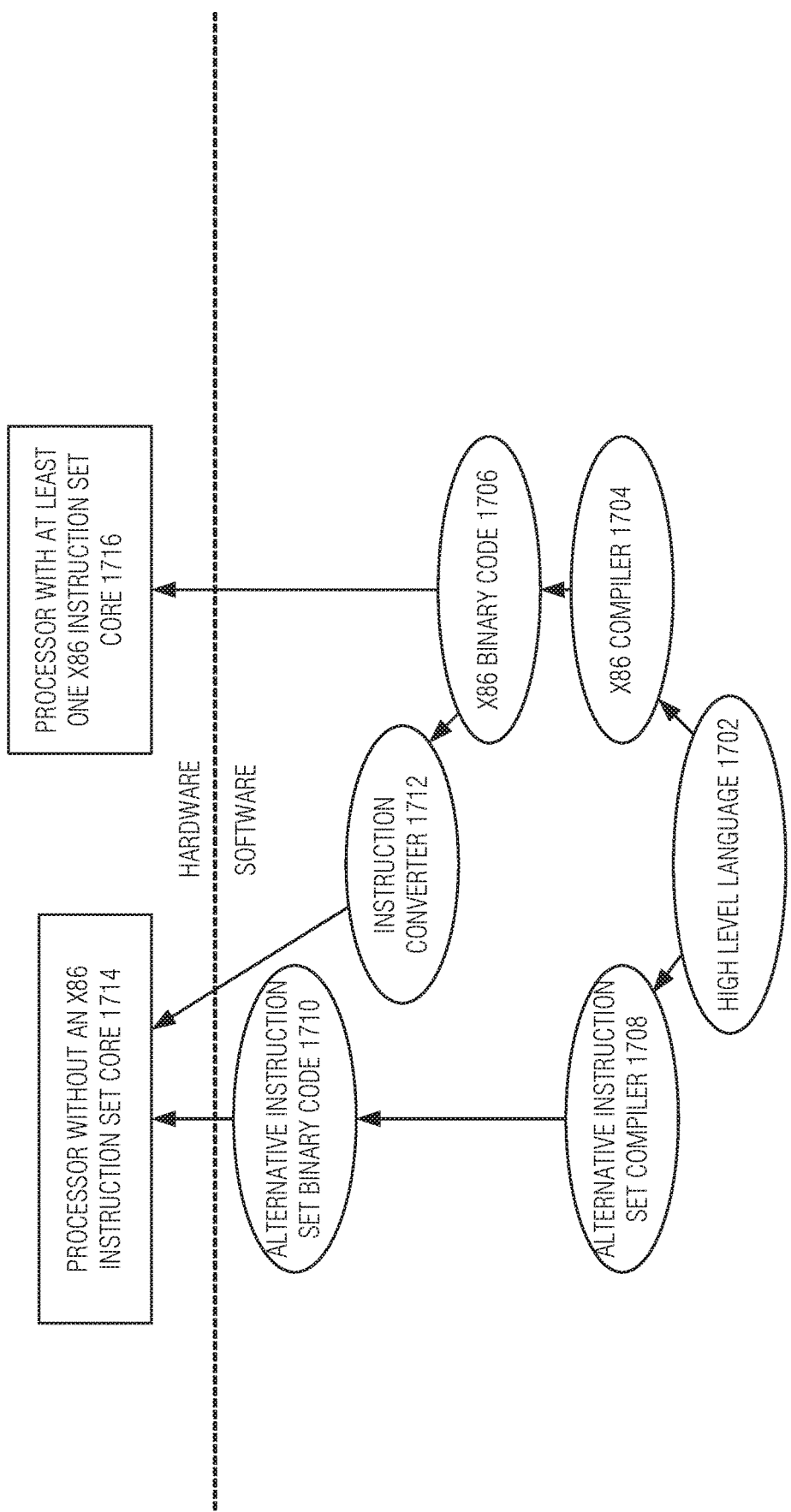
FIG. 23 is a block diagram contrasting the use of a software instruction converter to convert binary instructions in a source instruction set to binary instructions in a target instruction set according to embodiments of the invention.

FIG. 23 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2304 represents a compiler that is operable to generate x86 binary code 2306 (e.g., object code) that may, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have an x86 instruction set processor or core to execute the x86 binary code 2306.

ADDITIONAL NOTES & EXAMPLES

Example 1 is a neuromorphic hardware to implement spike timing dependent plasticity, the neuromorphic hardware comprising: an inter-chip network; and a plurality of neural-core structures connected by the inter-chip network, the plurality of neural-core structures to implement a set of neurons that include, a first neuron and a second neuron, each neural-core structure within the plurality of neural-core structures including: a memory to store neuron state; and processing circuitry to implement the first neuron to: receive, at a first time, a first spike from the second neuron; produce a second spike at a second time after the first time; receive, at a third time after the second time, a third spike from the second neuron, the third spike being a replay of the first spike with a defined time offset; and perform long term potentiation (LTP) for the first spike using the third spike.

In Example 2, the subject matter of Example 1 includes, wherein the defined time offset is measured in a number of time-steps for the neuromorphic hardware.

In Example 3, the subject matter of Examples 1-2 includes, wherein the defined time offset is a maximum spike timing dependent plasticity (STDP) time interval used for learning in the neuromorphic hardware.

In Example 4, the subject matter of Example 3 includes, wherein the third spike includes an indication that it is a replay of the first spike.

In Example 5, the subject matter of Examples 1-4 includes, wherein, to perform LTP for the first spike, the first neuron is to: calculate a time interval by which the first spike precedes the second spike; and use the time interval to adjust a synapse that received the first spike.

In Example 6, the subject matter of Example 5 includes, wherein, to calculate the time interval, the first neuron is to: subtract the third time from the second time to produce a result; and subtract the result from a maximum spike timing dependent plasticity (STDP) time interval used for learning in the neuromorphic hardware.

In Example 7, the subject matter of Examples 1-6 includes, wherein the first neuron is to, at a fourth time prior to the first time, receive a fourth spike from the second neuron within the defined time offset, wherein performance of LTP for the first spike is unaffected by the fourth spike, a replay of the fourth spike from the second neuron being replaced by the replay of the first spike.

In Example 8, the subject matter of Examples 1-7 includes, wherein the first neuron is to: receive, at a fourth time, a fourth spike from the second neuron; produce a fifth spike at a fifth time after the first time; receive, at a sixth time after the fifth time, a sixth spike from the second neuron, the sixth spike including a time delta between the fourth spike and the sixth spike; and perform long term potentiation (LTP) for the fourth spike using the time delta of the sixth spike.

In Example 9, the subject matter of Example 8 includes, wherein the first neuron is to perform long term depression (LTD) for the sixth spike.

In Example 10, the subject matter of Example 9 includes, wherein the first neuron is to perform LTP and LTD in parallel.

In Example 11, the subject matter of Examples 1-10 includes, wherein the neural-core structures do not have a memory for received spikes.

In Example 12, the subject matter of Examples 1-11 includes, wherein the neural-core structures are connected by a network fabric that does not include a connection from the first neuron to the second neuron.

In Example 13, the subject matter of Examples 1-12 includes, wherein the neuromorphic hardware is included in a system, the system comprising: an interface, external to the neuromorphic hardware, to pass data to the neuromorphic hardware.

In Example 14, the subject matter of Examples 1-13 includes, wherein the neuromorphic hardware is included in a system, the system comprising: processing circuitry, external to the neuromorphic hardware, to: invoke the neuromorphic hardware with data as input to a SNN implemented on the neuromorphic hardware; and obtain a classification result for the data from the neuromorphic hardware.

In Example 15, the subject matter of Example 14 includes, wherein the system comprises a sensor, and wherein the sensor is to provide the data.

In Example 16, the subject matter of Example 15 includes, wherein the sensor is a camera.

In Example 17, the subject matter of Example 16 includes, wherein the classification is an object recognition.

Example 18 is a method for spike timing dependent plasticity in neuromorphic hardware, the method comprising: receiving, at a first neuron at a first time, a first spike from a second neuron; producing, at the first neuron, a second spike at a second time after the first time; receiving, at the first neuron at a third time after the second time, a third spike from the second neuron, the third spike being a replay of the first spike with a defined time offset; and performing, by the first neuron, long term potentiation (LTP) for the first spike using the third spike.

In Example 19, the subject matter of Example 18 includes, wherein the defined time offset is measured in a number of time-steps for the neuromorphic hardware.

In Example 20, the subject matter of Examples 18-19 includes, wherein the defined time offset is a maximum spike timing dependent plasticity (STDP) time interval used for learning in the neuromorphic hardware.

In Example 21, the subject matter of Example 20 includes, wherein the third spike includes an indication that it is a replay of the first spike.

In Example 22, the subject matter of Examples 18-21 includes, wherein performing LTP for the first spike includes: calculating a time interval by which the first spike precedes the second spike; and using the time interval to adjust a synapse that received the first spike.

In Example 23, the subject matter of Example 22 includes, wherein calculating the time interval includes: subtracting the third time from the second time to produce a result; and subtracting the result from a maximum spike timing dependent plasticity (STDP) time interval used for learning in the neuromorphic hardware.

In Example 24, the subject matter of Examples 18-23 includes, receiving, at the first neuron at a fourth time prior to the first time, a fourth spike from the second neuron within the defined time offset, wherein performing LTP for the first spike is unaffected by the fourth spike, a replay of the fourth spike from the second neuron being replaced by the replay of the first spike.

In Example 25, the subject matter of Examples 18-24 includes, receiving, at the first neuron at a fourth time, a fourth spike from the second neuron; producing, at the first neuron, a fifth spike at a fifth time after the first time; receiving, at the first neuron at a sixth time after the fifth time, a sixth spike from the second neuron, the sixth spike including a time delta between the fourth spike and the sixth spike; and performing, by the first neuron, long term potentiation (LTP) for the fourth spike using the time delta of the sixth spike.

In Example 26, the subject matter of Example 25 includes, wherein the first neuron performs long term depression (LTD) for the sixth spike.

In Example 27, the subject matter of Example 26 includes, wherein the first neuron performs LTP and LTD in parallel.

In Example 28, the subject matter of Examples 18-27 includes, wherein the neuromorphic hardware includes a set of neural-core structures, each neural-core structure simulating a set of neurons, the first neuron and the second neuron being implemented in a neural-core structure of the set of neuro-structures.

In Example 29, the subject matter of Example 28 includes, wherein the neural-core structures do not have a memory for received spikes.

In Example 30, the subject matter of Examples 28-29 includes, wherein the neural-core structures are connected by a network fabric that does not include a connection from the first neuron to the second neuron.

Example 31 is a machine readable medium including instructions that, when executed by a machine, cause the machine to perform any method of Examples 18-30.

Example 32 is a system comprising means to perform any method of Examples 18-30.

Example 33 is at least one machine readable medium including instructions to implement spike timing dependent plasticity in neuromorphic hardware, the instructions, when executed by a machine, cause the machine to perform operations comprising: receiving, at a first neuron at a first time, a first spike from a second neuron; producing, at the first neuron, a second spike at a second time after the first time; receiving, at the first neuron at a third time after the second time, a third spike from the second neuron, the third spike being a replay of the first spike with a defined time offset; and performing, by the first neuron, long term potentiation (LTP) for the first spike using the third spike.

In Example 34, the subject matter of Example 33 includes, wherein the defined time offset is measured in a number of time-steps for the neuromorphic hardware.

In Example 35, the subject matter of Examples 33-34 includes, wherein the defined time offset is a maximum spike timing dependent plasticity (STDP) time interval used for learning in the neuromorphic hardware.

In Example 36, the subject matter of Example 35 includes, wherein the third spike includes an indication that it is a replay of the first spike.

In Example 37, the subject matter of Examples 33-36 includes, wherein performing LTP for the first spike includes: calculating a time interval by which the first spike precedes the second spike; and using the time interval to adjust a synapse that received the first spike.

In Example 38, the subject matter of Example 37 includes, wherein calculating the time interval includes: subtracting the third time from the second time to produce a result; and subtracting the result from a maximum spike timing dependent plasticity (STDP) time interval used for learning in the neuromorphic hardware.

In Example 39, the subject matter of Examples 33-38 includes, wherein the operations comprise receiving, at the first neuron at a fourth time prior to the first time, a fourth spike from the second neuron within the defined time offset, wherein performing LTP for the first spike is unaffected by the fourth spike, a replay of the fourth spike from the second neuron being replaced by the replay of the first spike.

In Example 40, the subject matter of Examples 33-39 includes, wherein the operations comprise: receiving, at the first neuron at a fourth time, a fourth spike from the second neuron; producing, at the first neuron, a fifth spike at a fifth time after the first time; receiving, at the first neuron at a sixth time after the fifth time, a sixth spike from the second neuron, the sixth spike including a time delta between the fourth spike and the sixth spike; and performing, by the first neuron, long term potentiation (LTP) for the fourth spike using the time delta of the sixth spike.

In Example 41, the subject matter of Example 40 includes, wherein the first neuron performs long term depression (LTD) for the sixth spike.

In Example 42, the subject matter of Example 41 includes, wherein the first neuron performs LTP and LTD in parallel.

In Example 43, the subject matter of Examples 33-42 includes, wherein the neuromorphic hardware includes a set of neural-core structures, each neural-core structure simulating a set of neurons, the first neuron and the second neuron being implemented in a neural-core structure of the set of neuro-structures.

In Example 44, the subject matter of Example 43 includes, wherein the neural-core structures do not have a memory for received spikes.

In Example 45, the subject matter of Examples 43-44 includes, wherein the neural-core structures are connected by a network fabric that does not include a connection from the first neuron to the second neuron.

Example 46 is a system for spike timing dependent plasticity in neuromorphic hardware, the system comprising: means for receiving, at a first neuron at a first time, a first spike from a second neuron; means for producing, at the first neuron, a second spike at a second time after the first time; means for receiving, at the first neuron at a third time after the second time, a third spike from the second neuron, the third spike being a replay of the first spike with a defined time offset; and means for performing, by the first neuron, long term potentiation (LTP) for the first spike using the third spike.

In Example 47, the subject matter of Example 46 includes, wherein the defined time offset is measured in a number of time-steps for the neuromorphic hardware.

In Example 48, the subject matter of Examples 46-47 includes, wherein the defined time offset is a maximum spike timing dependent plasticity (STDP) time interval used for learning in the neuromorphic hardware.

In Example 49, the subject matter of Example 48 includes, wherein the third spike includes an indication that it is a replay of the first spike.

In Example 50, the subject matter of Examples 46-49 includes, wherein the means for performing LTP for the first spike include means for: means for calculating a time interval by which the first spike precedes the second spike; and means for using the time interval to adjust a synapse that received the first spike.

In Example 51, the subject matter of Example 50 includes, wherein the means for calculating the time interval include: means for subtracting the third time from the second time to produce a result; and means for subtracting the result from a maximum spike timing dependent plasticity (STDP) time interval used for learning in the neuromorphic hardware.

In Example 52, the subject matter of Examples 46-51 includes, means for receiving, at the first neuron at a fourth time prior to the first time, a fourth spike from the second neuron within the defined time offset, wherein performing LTP for the first spike is unaffected by the fourth spike, a replay of the fourth spike from the second neuron being replaced by the replay of the first spike.

In Example 53, the subject matter of Examples 46-52 includes, means for receiving, at the first neuron at a fourth time, a fourth spike from the second neuron; means for producing, at the first neuron, a fifth spike at a fifth time after the first time; means for receiving, at the first neuron at a sixth time after the fifth time, a sixth spike from the second neuron, the sixth spike including a time delta between the fourth spike and the sixth spike; and means for performing, by the first neuron, long term potentiation (LTP) for the fourth spike using the time delta of the sixth spike.

In Example 54, the subject matter of Example 53 includes, wherein the first neuron performs long term depression (LTD) for the sixth spike.

In Example 55, the subject matter of Example 54 includes, wherein the first neuron performs LTP and LTD in parallel.

In Example 56, the subject matter of Examples 46-55 includes, wherein the neuromorphic hardware includes a set of neural-core structures, each neural-core structure simulating a set of neurons, the first neuron and the second neuron being implemented in a neural-core structure of the set of neuro-structures.

In Example 57, the subject matter of Example 56 includes, wherein the neural-core structures do not have a memory for received spikes.

In Example 58, the subject matter of Examples 56-57 includes, wherein the neural-core structures are connected by a network fabric that does not include a connection from the first neuron to the second neuron.

Example 59 is at least one machine-readable medium including instructions that, when executed by processing circuitry, cause the processing circuitry to perform operations to implement of any of Examples 1-58.

Example 60 is an apparatus comprising means to implement of any of Examples 1-58.

Example 61 is a system to implement of any of Examples 1-58.

Example 62 is a method to implement of any of Examples 1-58.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A neuromorphic hardware to implement spike timing dependent plasticity, the neuromorphic hardware comprising:
    an inter-chip network; and
    a plurality of neural-core structures connected by the inter-chip network, the plurality of neural-core structures to implement a set of neurons that include a first neuron and a second neuron, each neural-core structure within the plurality of neural-core structures including:
        a memory to store neuron state; and
        processing circuitry to implement the first neuron to:
            receive, at a first time, a first spike from the second neuron;
            produce a second spike at a second time after the first time;
            receive, at a third time after the second time, a third spike from the second neuron, the third spike being a replay of the first spike with a defined time offset; and
            perform long term potentiation (LTP) for the first spike using the third spike.

2. The neuromorphic hardware of claim 1, wherein the defined time offset is measured in a number of time-steps for the neuromorphic hardware.

3. The neuromorphic hardware of claim 1, wherein the defined time offset is a maximum spike timing dependent plasticity (STDP) time interval used for learning in the neuromorphic hardware.

4. The neuromorphic hardware of claim 3, wherein the third spike includes an indication that it is a replay of the first spike.

5. The neuromorphic hardware of claim 1, wherein, to perform LTP for the first spike, the first neuron is to:
    calculate a time interval by which the first spike precedes the second spike; and
    use the time interval to adjust a synapse that received the first spike.

6. The neuromorphic hardware of claim 5, wherein, to calculate the time interval, the first neuron is to:
    subtract the third time from the second time to produce a result; and
    subtract the result from a maximum spike timing dependent plasticity (STDP) time interval used for learning in the neuromorphic hardware.

7. The neuromorphic hardware of claim 1, wherein the first neuron is to, at a fourth time prior to the first time, receive a fourth spike from the second neuron within the defined time offset, wherein performance of LTP for the first spike is unaffected by the fourth spike, a replay of the fourth spike from the second neuron being replaced by the replay of the first spike.

8. The neuromorphic hardware of claim 1, wherein the first neuron is to:
    receive, at a fourth time, a fourth spike from the second neuron;
    produce a fifth spike at a fifth time after the first time;
    receive, at a sixth time after the fifth time, a sixth spike from the second neuron, the sixth spike including a time delta between the fourth spike and the sixth spike; and
    perform long term potentiation (LTP) for the fourth spike using the time delta of the sixth spike.

9. The neuromorphic hardware of claim 8, wherein the first neuron is to perform long term depression (LTD) for the sixth spike.

10. The neuromorphic hardware of claim 1, wherein the neural-core structures do not have a memory for received spikes.

11. The neuromorphic hardware of claim 1, wherein the neural-core structures are connected by a network fabric that does not include a connection from the first neuron to the second neuron.

12. The neuromorphic hardware of claim 1, wherein the neuromorphic hardware is included in a system, the system comprising:
    an interface, external to the neuromorphic hardware, to pass data to the neuromorphic hardware.

13. The neuromorphic hardware of claim 1, wherein the neuromorphic hardware is included in a system, the system comprising:
    processing circuitry, external to the neuromorphic hardware, to:
        invoke the neuromorphic hardware with data as input to a SNN implemented on the neuromorphic hardware; and
        obtain a classification result for the data from the neuromorphic hardware.

14. The neuromorphic hardware of claim 13, wherein the system comprises a sensor, and wherein the sensor is to provide the data.

15. The neuromorphic hardware of claim 14, wherein the sensor is a camera.

16. The neuromorphic hardware of claim 15, wherein the classification is an object recognition.

17. At least one machine readable medium including instructions to implement spike timing dependent plasticity in neuromorphic hardware, the instructions, when executed by a machine, cause the machine to perform operations comprising:
    receiving, at a first neuron at a first time, a first spike from a second neuron;
    producing, at the first neuron, a second spike at a second time after the first time;

receiving, at the first neuron at a third time after the second time, a third spike from the second neuron, the third spike being a replay of the first spike with a defined time offset; and performing, by the first neuron, long term potentiation (LTP) for the first spike using the third spike.

18. The machine readable medium of claim 17, wherein the defined time offset is measured in a number of time-steps for the neuromorphic hardware.

19. The machine readable medium of claim 17, wherein the defined time offset is a maximum spike timing dependent plasticity (STDP) time interval used for learning in the neuromorphic hardware.

20. The machine readable medium of claim 17, wherein performing LTP for the first spike includes:

calculating a time interval by which the first spike precedes the second spike; and using the time interval to adjust a synapse that received the first spike.

21. The machine readable medium of claim 20, wherein calculating the time interval includes:

subtracting the third time from the second time to produce a result; and subtracting the result from a maximum spike timing dependent plasticity (STDP) time interval used for learning in the neuromorphic hardware.

22. The machine readable medium of claim 17, wherein the operations comprise receiving, at the first neuron at a fourth time prior to the first time, a fourth spike from the second neuron within the defined time offset, wherein performing LTP for the first spike is unaffected by the fourth spike, a replay of the fourth spike from the second neuron being replaced by the replay of the first spike.

23. The machine readable medium of claim 17, wherein the neuromorphic hardware includes a set of neural-core structures, each neural-core structure simulating a set of neurons, the first neuron and the second neuron being implemented in a neural-core structure of the set of neuro-structures.

24. The machine readable medium of claim 23, wherein the neural-core structures do not have a memory for received spikes.

25. The machine readable medium of claim 23, wherein the neural-core structures are connected by a network fabric that does not include a connection from the first neuron to the second neuron.

* * * * *